US008977642B2

(12) United States Patent
Paul et al.

(10) Patent No.: US 8,977,642 B2
(45) Date of Patent: Mar. 10, 2015

(54) RECOMMENDING RELEVANT AND PERSONALIZED CONTENT ACCESSING KEYWORDS FOR USERS OF A TEXT MESSAGING SERVICE BASED GLOBAL TEXTSITE PLATFORM

(71) Applicants: Samit Paul, Bangalore (IN); Gopi Krishnan Nambiar, Bangalore (IN); Srividhya Ramarathnam, Bangalore (IN); Vishal Singh, Bangalore (IN)

(72) Inventors: Samit Paul, Bangalore (IN); Gopi Krishnan Nambiar, Bangalore (IN); Srividhya Ramarathnam, Bangalore (IN); Vishal Singh, Bangalore (IN)

(73) Assignee: Intuit Inc., Mountain View, CA (US)

( * ) Notice: Subject to any disclaimer, the term of this patent is extended or adjusted under 35 U.S.C. 154(b) by 176 days.

(21) Appl. No.: 13/841,930

(22) Filed: Mar. 15, 2013

(65) Prior Publication Data

US 2013/0282750 A1  Oct. 24, 2013

Related U.S. Application Data

(63) Continuation-in-part of application No. 12/728,169, filed on Mar. 19, 2010, now Pat. No. 8,452,313.

(30) Foreign Application Priority Data

Mar. 13, 2013 (IN) .............................. 282/KOL/2013

(51) Int. Cl.
*G06F 17/30* (2006.01)
*H04W 4/18* (2009.01)
*H04W 4/02* (2009.01)
*H04W 4/14* (2009.01)

(52) U.S. Cl.
CPC ........... *G06F 17/30675* (2013.01); *H04W 4/18* (2013.01); *H04W 4/02* (2013.01); *H04W 4/14* (2013.01)
USPC .......................................... 707/767; 707/769

(58) Field of Classification Search
None
See application file for complete search history.

(56) References Cited

U.S. PATENT DOCUMENTS

| 2005/0198068 | A1 | 9/2005 | Mukherjee et al. |
| 2008/0270167 | A1* | 10/2008 | Wee et al. .......................... 705/1 |
| 2012/0173562 | A1 | 7/2012 | Zhu et al. |
| 2012/0173563 | A1* | 7/2012 | Griffin et al. ................. 707/769 |
| 2012/0271843 | A1* | 10/2012 | Li et al. ........................ 707/767 |

FOREIGN PATENT DOCUMENTS

KR   10-2009-0001997 A   1/2009

OTHER PUBLICATIONS

International Search Report and Written Opinion for PCT/US2013/034423, dated Dec. 18, 2013 (9 pages).
Korean Intellectual Property Office Abstract for Publication No. 10-2009-0001997, published on Jan. 9, 2009 (1 page).

* cited by examiner

*Primary Examiner* — Belix M Ortiz Ditren
(74) *Attorney, Agent, or Firm* — Osha Liang LLP

(57) ABSTRACT

A method and system for recommending relevant and personalized content retrieving keywords to users of a text messaging service (TMS) based content platform. Embodiments of the invention provide a discovery mechanism for introducing registered keywords identifying published information in the TMS based content platform that may be of interest to the user. In particular, the solution is hybrid in nature combining various sources of recommendations (e.g., based on past usage patterns, emerging trends, expert suggestions, etc.) to select recommended keywords. Based on this keyword discovery/recommendation mechanism, users with a basic phone and without smartphone data plans can discover contents through a TMS based content platform.

24 Claims, 16 Drawing Sheets

RECOMMENDING RELEVANT AND PERSONALIZED CONTENT ACCESSING KEYWORDS FOR USERS OF A TEXT MESSAGING SERVICE BASED GLOBAL TEXTSITE PLATFORM

CROSS-REFERENCE TO RELATED APPLICATIONS

This application is a continuation-in-part (CIP) of U.S. patent application Ser. No. 12/728,169, filed on Mar. 19, 2010. Accordingly, this application claims benefit under 35 U.S.C. §120 to U.S. patent application Ser. No. 12/728,169. U.S. patent application Ser. No. 12/728,169 is hereby incorporated by reference in its entirety.

This application claims priority, under 35 U.S.C. §119(a), to Indian Patent Application No. 282/KOL/2013, filed on Mar. 13, 2013, and entitled: "RECOMMENDING RELEVANT AND PERSONALIZED CONTENT ACCESSING KEYWORDS FOR USERS OF A TEXT MESSAGING SERVICE BASED GLOBAL TEXTSITE PLATFORM".

BACKGROUND

Today's mobile devices, such as smart phones, allow users to browse the Internet from any location to obtain information on demand. As long as a user is in an area with the proper telecommunication network and subscribes to a data plan, the user is provided with access to the Internet for web browsing to obtain information such as phone numbers for service provides, map out a particular destination location, and obtain information relevant to the user's current or next activity. However, there are often instances in which a user wishes to access only limited information for a quick answer to a question (e.g., what are the next available show times for a particular movie?). In this scenario, browsing the website for the movie theater or a service provider website that provides movie show times, such as Fandango, may be cumbersome on the mobile device. Specifically, loading all the graphics and advertisements associated with websites on a mobile device can take additional time. In other words, the entire website may provide too much data to navigate through when a user desires only a specific piece of information. In addition, for mobile device users who do not subscribe to a data plan for browsing the Internet, are in an area without the proper telecommunication network, or do not have browsing capability on their mobile device, accessing such information on demand is not possible.

As an alternative, information content similar to what is available via the Internet may be provided by a text messaging service (TMS) based platform. For example, the user may request desired information by sending a registered keyword via a TMS message to the TMS based platform. The registered keyword identifies such user requested information and is registered with the TMS based platform by an information publisher. As additional information is published in the TMS based platform, the registered keyword collection grows in size and the user needs an effective discovery mechanism to find new keyword that identifies published information of interest to the user.

SUMMARY

In general, in one aspect, the invention relates to a method for providing a keyword recommendation for a user to access content from a global textsite platform (GTP). The method includes obtaining a first registered unique keyword, of a plurality of registered unique keywords, from a user message sent to the GTP by the user, wherein the plurality of registered unique keywords are used by a plurality of GTP users to access content from the GTP based on a text messaging service (TMS), selecting a keyword recommendation algorithm from a plurality of keyword recommendation algorithms based on a pre-determined selection sequence assigned to the plurality of keyword recommendation algorithms and a previously selected keyword recommendation algorithm, analyzing, by a computer processor using the keyword recommendation algorithm and based at least on the first registered unique keyword, a GTP usage pattern to select a recommended keyword from the plurality of registered unique keywords, wherein the GTP usage pattern comprises statistical information of the plurality of GTP users using the plurality of registered unique keywords to access content from the GTP, and sending the recommended keyword to the GTP, wherein the GTP sends, to the user in response to the user message, a GTP message comprising a keyword recommendation that identifies the recommended keyword, and wherein the user message and the GTP message comprise a TMS message.

In general, in one aspect, the invention relates to a system for providing a keyword recommendation for a user to access content from a global textsite platform (GTP). The system includes a computer processor, memory storing instructions executable by the computer processor, wherein the instructions comprise a GTP interface module configured to obtain a first registered unique keyword, of a plurality of registered unique keywords, from a user message sent to the GTP by the user, wherein the plurality of registered unique keywords are used by a plurality of GTP users to access content from the GTP based on a text messaging service (TMS), and sending a recommended keyword to the GTP, a hybrid business rule module configured to select a keyword recommendation algorithm from a plurality of keyword recommendation algorithms based on a pre-determined selection sequence assigned to the plurality of keyword recommendation algorithms and a previously selected keyword recommendation algorithm, and an analysis module configured to analyze, using the keyword recommendation algorithm and based at least on the first registered unique keyword, a GTP usage pattern to select the recommended keyword from the plurality of registered unique keywords, wherein the GTP usage pattern comprises statistical information of the plurality of GTP users using the plurality of registered unique keywords to access content from the GTP, and a repository for storing the GTP usage pattern and the pre-determined selection sequence assigned to the plurality of keyword recommendation algorithms, wherein the GTP sends, to the user in response to the user message, a GTP message comprising a keyword recommendation that identifies the recommended keyword, and wherein the user message and the GTP message comprise a TMS message.

In general, in one aspect, the invention relates to a non-transitory computer readable storage medium comprising software instructions for providing a keyword recommendation for a user to access content from a global textsite platform (GTP), that when executed, comprise functionality for obtaining a first registered unique keyword, of a plurality of registered unique keywords, from a user message sent to the GTP by the user, wherein the plurality of registered unique keywords are used by a plurality of GTP users to access content from the GTP based on a text messaging service (TMS), selecting a keyword recommendation algorithm from a plurality of keyword recommendation algorithms based on a pre-determined selection sequence assigned to the plurality of keyword recommendation algorithms and a previously selected keyword recommendation algorithm, analyzing, using the keyword recommendation algorithm and based at least on the first registered unique keyword, a GTP usage pattern to select a recommended keyword from the plurality of registered unique keywords, wherein the GTP usage pattern comprises statistical information of the plurality of GTP users using the plurality of registered unique keywords to access content from the GTP, and sending the recommended keyword to the GTP, wherein the GTP sends, to the user in response to the user message, a GTP message comprising a keyword recommendation that identifies the recommended keyword, and wherein the user message and the GTP message comprise a TMS message.

Other aspects of the invention will be apparent from the following description and the appended claims.

DETAILED DESCRIPTION

Figure 1A:
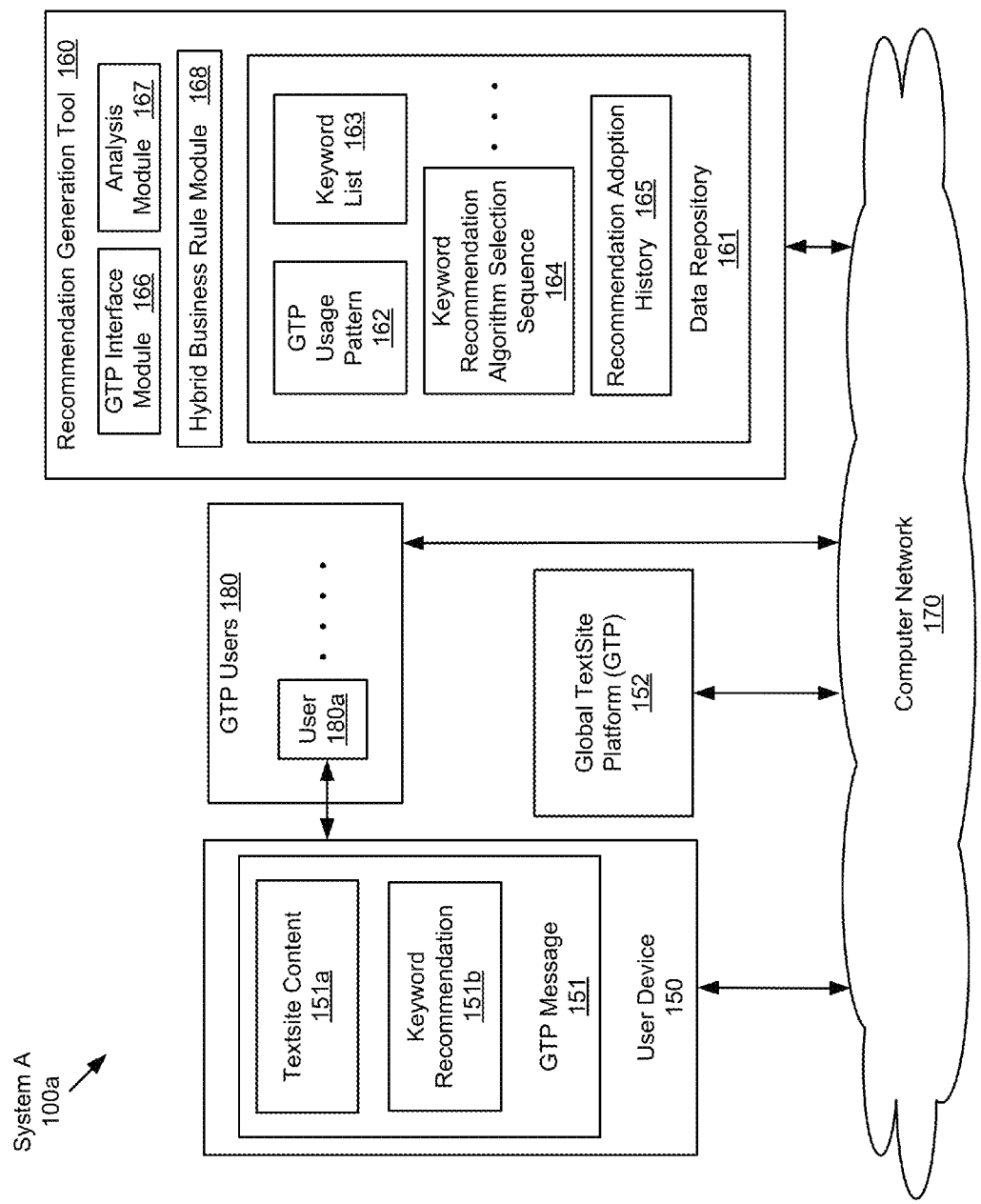
FIGS. 1A and 1B show block diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for recommending relevant and personalized content retrieving keywords to users of a text messaging service (TMS) based content platform. In other words, embodiments of the invention provide a discovery mechanism for introducing registered keywords identifying published information in the TMS based content platform that may be of interest to the user.

In one or more embodiments, the solution is hybrid in nature combining various sources of recommendations (e.g., based on past usage patterns, emerging trends, expert suggestions, etc.) to select recommended keywords. Based on this keyword discovery/recommendation mechanism, users with a basic phone and without smartphone data plans can discover contents through a TMS based content platform. For example, this may be particularly useful in emerging market economies such as India where data plans are expensive.

FIG. 1A shows a block diagram of a system A (100a) for recommending relevant and personalized content accessing keywords for users of a text messaging service (TMS) based content platform in accordance with one or more embodiments of the invention. Specifically, the system A (100a) includes a user device (150) used by a user (180a), a global textsite platform (GTP) (152) (i.e., the TMS based content platform) used by GTP users (180), and a recommendation generation tool (160) coupled via a computer network (170). In one or more embodiments of the invention, the recommendation generation tool (160), or a portion thereof, may be integrated with the GTP (152). In one or more embodiments of the invention, one or more of the modules and elements shown in FIG. 1A may be omitted, repeated, and/or substituted. Accordingly, embodiments of the invention should not be considered limited to the specific arrangements of modules shown in FIG. 1A.

In one or more embodiments of the invention, the computer network (170) may include a cellular phone network, a wide area network, a local area network, a public switched telephone network (PSTN), or any other suitable network that facilitates the exchange of messages from one part of the network to another. In one or more embodiments, the computer network (170) is coupled to or overlap with the Internet. In one or more embodiments, each of the user device (150), the GTP (152), and the recommendation generation tool (160) may include any computing device configured with computing, data storage, and network communication functionalities. Generally, the GTP (152) is configured with high performance computing capability and large amount of data storage capacity to support multiple user devices (e.g., user device (150)) in a client server application environment. In one or more embodiments, the user device (150) may be a mobile device, such as a cellular phone or a smartphone used by the user (180a) (e.g., a person as one of the many users included in the GTP users (180)) to exchange TMS messages with the GTP (152). For example, the user device (150) may send, under a user's direction, a TMS message to the GTP (152) for requesting information. In response, the user device (150) may receive the GTP message (151) containing textsite content (151a) and keyword recommendation (151b). Detailed examples of the GTP (152), user device (150), GTP message (151), textsite content (151a), and keyword recommendation (151b) are described in reference to FIG. 1B and FIGS. 3A-4E below.

In one or more embodiments of the invention, the recommendation generation tool (160) includes a GTP interface module (166), an analysis module (167), a hybrid business rule module (168), and a data repository (161). In one or more embodiments, the data repository (161) may be any datastore (flat file, hierarchical file, relational database, object-oriented database, etc.) capable of storing data collected, generated, used or otherwise accessed by the GTP interface module (166), analysis module (167), and hybrid business rule module (168). As shown in FIG. 1A, the data repository (161) stores the GTP usage pattern (162), the keyword list (163), the keyword recommendation algorithm selection sequence (164), and the recommendation adoption history (165). The data repository (161) may include a disk drive storage device, a semiconductor storage device, other suitable computer data storage device, or combinations thereof.

In one or more embodiments of the invention, the GTP interface module (166) is configured to obtain a first registered unique keyword, of a collection of registered unique keywords, from a user message sent to the GTP (152) by the user (180) using the user device (150). As will be described in further details in reference to FIG. 1B below, the collection of registered unique keywords are used by GTP users (180) to access content from the GTP (152) based on TMS. In particular, the first registered unique keyword is sent by the user (180) to request GTP content, which is returned by the GTP (152) as the textsite content (151a). In one or more embodiments, a copy of the collection of registered unique keywords is stored in the repository (161) as the keyword list (163). In one or more embodiments, the first registered unique keyword is used by the recommendation generation tool (160) to select a recommended keyword from the keyword list (163). Accordingly, the recommended keyword is sent via the GTP interface module (166) to the GTP (152) for providing to the user of the user device (150).

In one or more embodiments, the GTP interface module (166) is further configured to obtain additional statistical usage information from the GTP (152), for example to be stored in the data repository (161) as the GTP usage pattern (162) and the recommendation adoption history (165). Details of how such statistical usage information may be used to facilitate the selection of recommended keywords are described below.

In one or more embodiments of the invention, the hybrid business rule module (168) is configured to obtain a specific usage level of the user (180a) using the collection registered unique keywords and/or the general usage level of the GTP users (180) using the first registered unique keyword. For example, the specific usage level may be determined based on the usage frequency of each registered unique keywords of the GTP (152) by the user (180a), while the general usage level may be based on the usage frequency of the first registered unique keyword by each of the GTP users (180). Based on different combinations of these usage levels, the hybrid business rule module (168) identifies a keyword recommendation algorithm selection sequence (e.g., the keyword recommendation algorithm selection sequence (164)) from a number of different keyword recommendation algorithm selection sequences, such that most relevant and personalized keyword recommendations may be generated. Examples scenarios of different of usage level combinations and corresponding keyword recommendation algorithm selection sequences are described in reference to FIG. 4A below.

In one or more embodiments, the hybrid business rule module (168) is further configured to select a keyword recommendation algorithm from a number of keyword recommendation algorithms based on the identified keyword recommendation algorithm selection sequence (164) and a previously selected keyword recommendation algorithm. Specifically, the keyword recommendation algorithm selection sequence (164) is assigned to these keyword recommendation algorithms for sequentially selecting a keyword recommendation algorithm to use for generating recommended keywords in a cyclical manner. In one or more embodiments, a pointer to the keyword recommendation algorithm selection sequence (164) is used to track the previously selected keyword recommendation algorithm. Examples of selecting the keyword recommendation algorithm based on the keyword recommendation algorithm selection sequence (164) to generate recommended keywords in a cyclical manner are described in reference to FIG. 4A below.

In one or more embodiments, the hybrid business rule module (168) is further configured to obtain a recommendation adoption pattern representing statistics of how previously provided keyword recommendations are accepted by the GTP users (180) in general, or by the user (180a) specifically. For example, the recommendation adoption pattern may be obtained by analyzing the recommendation adoption history (165) stored in the data repository (161). Accordingly, the hybrid business rule module (168) adjusts keyword recommendation algorithms based on the recommendation adoption pattern. For example, keyword recommendation algorithms may be adjusted such that well adopted (i.e., well known) keywords do not show up as irrelevant recommendations. In another example, keyword recommendation algorithms may be adjusted such that a well adopted (i.e., well known) keyword by many users of the GTP users (180) yet unknown to the user (180a) is recommended to the user (180a)

In one or more embodiments of the invention, the analysis module (167) is configured to analyze, using the aforementioned keyword recommendation algorithms and based on the first registered unique keyword, the GTP usage pattern (162) to select the recommended keyword from the keyword list (163). In one or more embodiments, the GTP usage pattern (162) includes statistical information of the GTP users (180) using the collection of registered unique keywords to access content from the GTP (152). For example, the statistical information may include a frequency of each user (in particular, the user (180a)) of the GTP users (180) using each keyword in the keyword list (163) to access content from the GTP (152) during a recent time period (e.g., most recent 3 days, 7 days, etc.). In one or more embodiments, a keyword recommendation algorithm identifies relevant and personalized keywords with respect to the first registered unique keyword based on general (i.e., across all of the GTP users (180)) usage pattern similarity between the first registered unique keyword and any other keyword in the keyword list (163). In one or more embodiments, the identified relevant and personalized keywords are further qualified by the keyword recommendation algorithm based on user specific (i.e., specific to the user (180a) if statistics are available) usage pattern similarity between the first registered unique keyword and any other keyword in the keyword list (163). In one or more embodiments, a keyword recommendation algorithm identifies relevant and personalized keywords based on emerging trends in the GTP usage pattern (162) or recommendations from expert users. Details and examples of the aforementioned keyword recommendation algorithms and the GTP usage pattern (162) are described in reference to FIGS. 2 and 4A below.

Figure 1B:
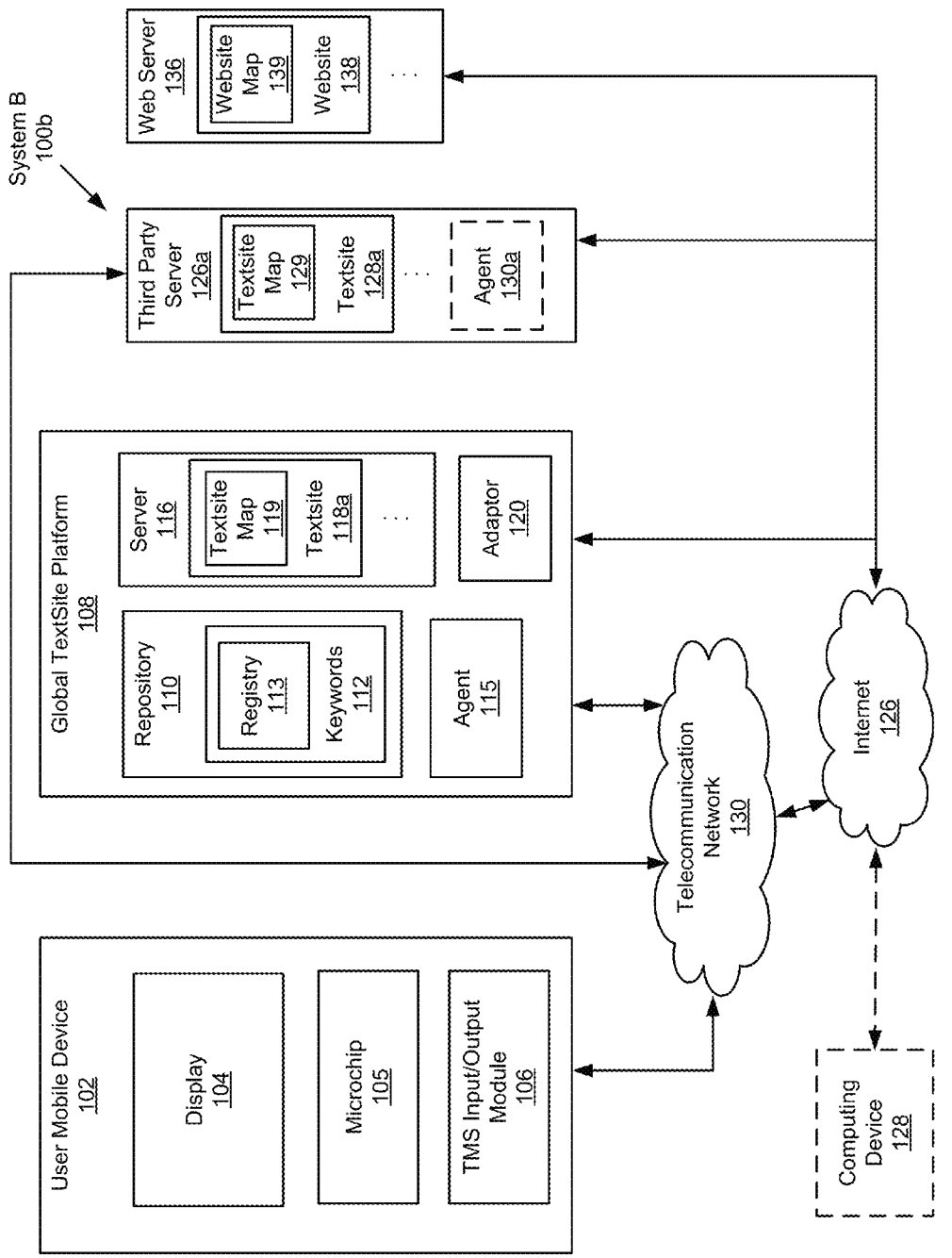

FIG. 1B shows a block diagram of a system (100b) for accessing content from a textsite in accordance with one or more embodiments of the invention. Specifically, FIG. 1B shows the global textsite platform (GTP) (108), a user mobile device (102), and a computing device (128) coupled via the telecommunication network (130) and/or the Internet (126). In one or more embodiments of the invention, the system (100b) is an example of the system (100a) depicted in FIG. 1A above. In one or more embodiments, the user mobile device (102) and the GTP (108) are examples of the user device (150) and the GTP (152), respectively, depicted in FIG. 1A above. In one or more embodiments of the invention, one or more of the modules and elements shown in FIG. 1B may be omitted, repeated, and/or substituted. Accordingly, embodiments of the invention should not be considered limited to the specific arrangements of modules shown in FIG. 1B.

Figure 5:
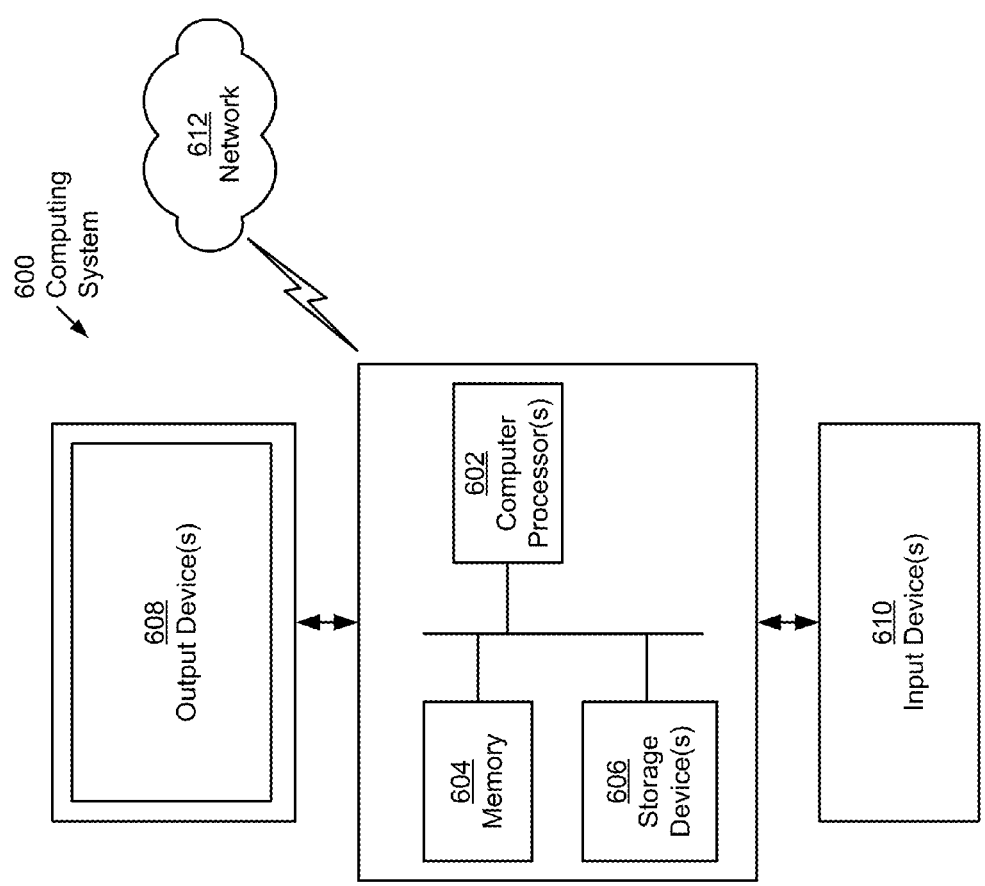
FIG. 5 shows a computer system in accordance with one or more embodiments of the invention.

In one or more embodiments of the invention, the global textsite platform (108) executes on one or more computing device(s) (e.g., a server, a computer system as shown in FIG. 5 and described below, etc.) and may be hosted by an entity, such as a corporation. In one or more embodiments of the invention, the global textsite platform (108) is associated with a platform syntax that is specific to the global textsite platform (108) and facilitates communication via a TMS. In one or more embodiments of the invention, the global textsite platform (108) may be associated with different unique phone numbers or codes corresponding to each different geographic location. Alternatively, a single, unique global number/code may be associated with the global textsite platform (108). In one or more embodiments of the invention, the global textsite platform (108) includes a repository (110) for storing keywords (112), a server (116) configured to host a plurality of textsites (e.g., textsite (118a)), an agent (115), and an adaptor (120). Those skilled in the art will appreciate that the server (116) may be any computing device with a large storage capacity.

The repository (110) may be any datastore (flat file, hierarchical file, relational database, enterprise-wide database, etc.) capable of storing data, regardless where or in what form the data originates. Keywords (112) may be reserved or pre-designated keywords maintained by the platform as part of the platform syntax, and publisher keywords that are registered by publishers for each textsite authored by a publisher. In one or more embodiments of the invention, pre-designated keywords and publisher registered keywords are unique. That is, no two keywords from the group of keywords that are pre-designated as platform syntax or the group of keywords provided by a publisher are allowed to be identical. In fact, in one or more embodiments of the invention, the keywords (112) are closely controlled by the global textsite platform (108) in an effort to eliminate duplicates. Navigating keywords, which a publisher defines for a textsite that is associated with a unique registered keyword, are also used. Navigating keywords are not required to be unique. For example, two distinct publishers with distinct registered keywords representing a first and a second textsite may use the same navigating keyword for different text pages associated with the first and second textsites.

In one or more embodiments, a portion of the keywords (112) is organized as a registry (113) storing a number of registered unique keywords each used as a site identifier and associated with metadata describing a mechanism for accessing corresponding site content, such as content stored in the textsite (118a), etc. In one or more embodiments, the registered unique keywords (i.e., used as site identifiers) are registered by textsite content publishers with relevant information processed into associated metadata. In one or more embodiments, the textsite (118a) may be hosted by the global textsite platform (108) on behalf of a first publisher or may be an in-house textsite maintained by the global textsite platform (108). In such embodiments, the metadata associated with the registered unique keyword (i.e., used as site identifiers) includes an internal link to the textsite (118a) within the global textsite platform (108).

In one or more embodiments, the textsite (128a) is published by a second publisher that has registered with the global textsite platform (108) but is hosted on a separate third party server (126a). In such embodiments, the metadata associated with the registered unique keyword (i.e., used as site identifier) includes an access path for the global textsite platform (108) to access the third party server (126a) via the telecommunication network (130) and/or the Internet (126). In one or more embodiments, the third party server (126a) may include agent (130a) configured with similar functionalities as those of the agent (115). For example, the agent (130a) may be provided to an operator of the third party server (126a) by an operator of the GTP (108) under a pre-determined business agreement (e.g., a licensing agreement).

In one or more embodiments, contents of the website (138) are converted by the global textsite platform (108) to be accessible to a user via TMS. In such embodiments, the metadata associated with the registered unique keyword includes an access path for the global textsite platform (108) to access the web server (136) via the Internet (126) and identifies whether the contents of the website (138), or a portion thereof, are converted dynamically (i.e., on demand) or statically (i.e., pre-converted and stored).

Generally, a publisher may be any person or entity that publishes information/content of a textsite (e.g., textsite (118a)) for users to access via a text messaging service or other network service. More specifically, a publisher may be any developer or service provider that provides a service or a product for users. For example, a publisher may be a restaurant owner that creates a textsite to provide information about his/her restaurant.

In one or more embodiments, a user is defined as a person or entity accessing content published by publishers and registered with the global textsite platform (108). As noted above, the published and registered content may be hosted by the global textsite platform (108). In one or more embodiments, a user is a person or entity with a mobile device that does not have a data plan subscription. Rather, the user is able to obtain data using the mobile device only via a TMS. That is, embodiments of the invention pertain specifically to users accessing content only via a TMS. Those skilled in the art will appreciate, however, that although embodiments of the invention target users that communicate via a TMS, the invention is not limited to such users. Specifically, while embodiments of the invention are directed to providing access to textsites to users using a mobile phone via a TMS, some users may be provided with the capability to access content on the global textsite platform (108) via a computing device (128), such as a desktop computer, a laptop computer, a thin computer, a combination thereof, or any other suitable electronic computing device that is capable of connecting to the global textsite platform (108) via the Internet (126). For example, in one or more embodiments, a user may use a text message emulator executing on the computing device (128) to connect to the global textsite platform (108) via the Internet (126). Alternatively, users with smart phones and/or mobile devices that support Internet browsing functionality could access content on the global textsite platform (108) using the Internet (126).

Further as shown in FIG. 1B, a user may possess the user mobile device (102) that is communicatively coupled to the global textsite platform (108) via the telecommunication network (130) and the Internet (126). The user mobile device (102) includes a display (104), a microchip (105), and a TMS input/output module (106). The user mobile device (102) may be any mobile device, such as a Code Division Multiple Access (CDMA) device, a global system mobile (GSM) device, a 3G device, a 4G device, a smart phone, a tablet, a pad device, a gaming device, a personal digital assistant, or any other suitable mobile device that includes text messaging functionality. In one or more embodiments of the invention, the user mobile device (102) is operatively connected to a global textsite platform (108) via a telecommunication network (130). The telecommunication network (130) may be any network that facilitates the exchange of messages from one part of the network to another. For example, the telecommunication network (130) may be a wide area network, a local area network, a public switched telephone network (PSTN), or any other suitable network for exchanging messages between the global textsite platform (108) and the user mobile device (102).

The display (104) of the user mobile device (102) may be a display screen using technology such as liquid crystal display (LCD), a light emitting diode (LED), organic light emitting diode (OLED), or any other suitable type of display screen capable of displaying the content of received text messages and the content of a text message that is being composed on the user mobile device (102). The microchip (105) may be any tangible hardware processor(s) or microprocessor(s) for executing the functionalities of the user mobile device (102). More specifically, the microchip (105)

executes the software application(s) that provide functionalities such as browsing, text messaging, maintaining a contact list and making phone calls, etc. The TMS input/output module (106) may be a virtual keyboard, a physical keyboard, or any other input/output device(s) or button(s) that allows the publisher to compose text messages and receive and read text message responses.

In the user system (100b) of FIG. 1B, the global textsite platform (108) is configured to receive a text message from the user mobile device (102) that includes a request to access a textsite hosted by the global textsite platform (108). Further, the global textsite platform (108) is configured to process the request received from the user mobile device (102), and to provide the content from the desired textsite to the user's mobile device (102) via a TMS.

To facilitate this interaction with a user mobile device (102), the global textsite platform (108) includes an agent (115). In one or more embodiments of the invention, the agent (115) may be software that is the component of the global textsite platform (108), which communicates with a user mobile device (102). Specifically, the agent (115) is configured with functionality to receive a text message (i.e., a user message) from a user mobile device (102), parse the text message for the relevant keywords or platform-specific syntax, and respond to the user request by identifying and retrieving the content from the requested textsite/converted website for delivering back to the user mobile device (102) in accordance with one or more embodiments of the invention. In one or more embodiments, the content is delivered to the user mobile device (102) in a text message sent from the global textsite platform (i.e., a GTP message).

In one or more embodiments of the invention, the agent (115) is configured to identify, based on the registry (113), a registered unique keyword (i.e., used as site identifier) in the user message as a request to access the textsite (118a) hosted on the global textsite platform (108) or the textsite (128a) hosted on the third party server (126a). Accordingly, the agent (115) is configured to access the textsite (118a) or the textsite (128a) using the aforementioned access path included in the associated metadata. In one or more embodiments, the agent (115) is configured to exchange text messages with the user mobile device (102) for navigating a text page hierarchy of the textsite (118a) or the textsite (128a). In one or more embodiments, the textsite (118a) and the textsite (128a) include textsite map (119) and textsite map (129), respectively, that describe the hierarchical relationships of text pages contained within each textsite (118a, 128). For example, the textsite map (119) and the textsite map (129) may each include a data structure (e.g., graph, tree, linked list, file, database, etc.) containing navigating keywords defined by the respective publisher. Generally speaking, navigating keyword information (e.g., access information such as location, address, or other information enabling access to a text page pointed to by a navigating keyword) and navigation paths among text pages in the textsite (e.g., textsite (118a)) are stored in the textsite map (e.g., textsite map (129)). Specifically, a navigation path leads from one text page to another via intervening text pages accessed using the navigating keywords contained in each of the text pages traversed along the navigation path. More details of navigating a textsite, for example based on the textsite map, by exchanging text messages between the agent (115) and the user mobile device (102), are described in reference to FIGS. 3A-3J below.

In one or more embodiments of the invention, the agent (115) is configured to identify, based on the registry (113), a registered unique keyword (i.e., used as site identifier) in the user message as a request to access the website (138) hosted on the web server (136). For example, such registered unique keyword may be registered by a publisher of an adaptor plug-in that maps the website map (139) into a global textsite platform syntax suitable for the adaptor (120) to convert contents of the website (138). Accordingly, the agent (115) is configured to activate the adaptor (120) for accessing the website (138) using the aforementioned access path included in the associated metadata. In one or more embodiments, the agent (115) is configured to exchange text messages with the user mobile device (102) and convert between such text messages in the global textsite platform syntax (e.g., navigating keywords) and the website map (139) for navigating a website document hierarchy of the website (138). For example, the mapping between such navigating keywords and the website map (139) may be contained in an adaptor plug-in for the website (138) where the navigating keywords are defined by the publisher of the adaptor plug-in.

In one or more embodiments of the invention, the agent (115) is configured to identify a web URL (i.e., used as website identifier in Universal Resource Locator format) in the user message as a request to access the website (138) hosted on the web server (136). Accordingly, the agent (115) is configured to activate the adaptor (120) for accessing the website (138) using the identified web URL via the Internet (126). The subsequent navigation of the website (138) may be essentially the same as described above.

In one or more embodiments of the invention, the textsite (118a), the textsite (128a), and/or the website (138) are configured to integrate contents from each other. In such embodiments, the textsite map (119), the textsite map (129), and/or the website map (139) are configured to include registered unique keywords (i.e., used as site identifiers) of other textsites and/or websites, which may be included in user text messages for redirecting the user mobile device (102) from one site (e.g., one of the textsite (118a), the textsite (128a), and the website (138)) to another during navigation of textsite content or converted website content.

In one or more embodiments of the invention, the aforementioned text messages exchanged between the user mobile device (102) and the global textsite platform (108), and more specifically between the user mobile device (102) and the agent (115), are of the same TMS protocol. Alternatively, text messages exchanged may include more than one TMS protocol. For example, the user messages may be SMS and the GTP messages may be MMS. Additional combinations are also possible in other examples.

Although the description above uses the user mobile device (102) in various example embodiments, those skilled in the art will appreciate that similar functionalities may be achieved by substituting the user mobile device (102) with the computing device (128). Further, the aforementioned redirecting functionality may be adapted to allow browsing of website (138) using the computing device (128) to be redirected to accessing a textsite (e.g., textsite (118a) or textsite (128a)) using the user mobile device (102) and vice-versa.

Although the GTP data (e.g., keywords, registry, textsite map, etc.) shown in FIG. 1B above are described in specific formats and organizations, those skilled in the art with the benefit of this disclosure will recognize that GTP data may be in other formats or organizations without deviating from the spirit of the invention.

Figure 2A:
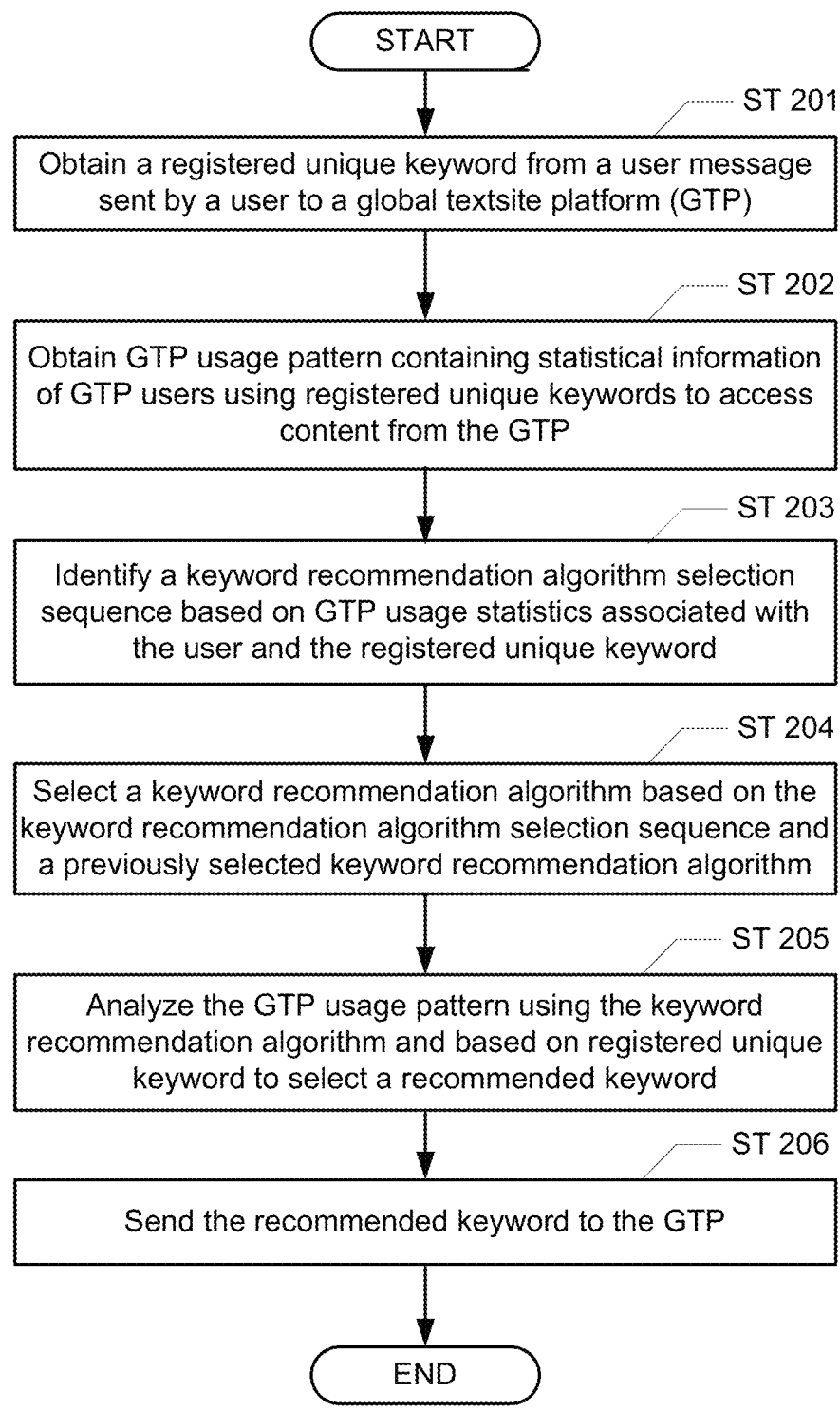
FIGS. 2A and 2B show flow charts of methods in accordance with one or more embodiments of the invention.

FIG. 2A shows a flow chart for recommending relevant and personalized content retrieving keyword to users to a text messaging service (TMS) based content platform in accordance with one or more embodiments of the invention. In one or more embodiments of the invention, the TMS based content platform may be the global textsite platform (GTP)

described in reference to FIG. 1B above. In one or more embodiments of the invention, the method of FIG. 2A may be practiced using the system (100a) described in reference to FIG. 1A above. In one or more embodiments of the invention, one or more of the steps shown in FIG. 2A may be omitted, repeated, and/or performed in a different order than that shown in FIG. 2A. Accordingly, the specific arrangement of steps shown in FIG. 2 should not be construed as limiting the scope of the invention.

Initially in Step 201, a registered unique keyword (referred to as the particular registered unique keyword) is obtained from a user (referred to as the particular user) message sent to the GTP by the user. For example, the user message may be a TMS message. In one or more embodiments, the GTP is a TMS based content platform described in reference to FIG. 1B above. Specifically, the registered unique keyword is one of many registered unique keywords that are registered by content publishers of the GTP and are used by GTP users to access published content from the GTP based on the TMS. Additional details of sending the user message to request content from the GTP based on the registered unique keywords are described in reference to FIG. 2B below.

In Step 202, statistical usage information of the GTP is obtained. The statistical usage information and/or statistical features derived from the statistical usage information are stored as the GTP usage pattern for later analysis. In one or more embodiments, the statistical usage information include usage frequencies of one or more registered unique keywords of the GTP used by one or more GTP users within a pre-determined time period. For example, the statistical usage information may include the usage frequency of each registered unique keyword used by each GTP user in a recent time period, such as the most recent 3 days, 5 days, or other suitable recent time period. In one or more embodiments, the GTP usage pattern includes a user specific usage pattern based on the usage frequency of each registered unique keyword used by the particular user in a recent time period. In one or more embodiments, the GTP usage pattern includes a keyword specific usage pattern based on the usage frequency of the particular registered unique keyword used by each GTP user in a recent time period. Examples of the user specific usage pattern and the keyword specific usage pattern are described in reference to FIG. 4A below.

In Step 203, a keyword recommendation algorithm selection sequence is identified based on the statistical usage information of the GTP. Specifically, the keyword recommendation algorithm selection sequence is a sequence assigned to a number of different keyword recommendation algorithms such that all keyword recommendation algorithms are used in a cyclic manner for generating keyword recommendations. In particular, these keyword recommendations introduce various registered unique keywords in the cyclic manner to the particular user each time the particular user requests to access the GTP.

In one or more embodiments, each keyword recommendation algorithm is based on a specific feature of the GTP usage pattern, such as statistical features across all GTP users with or without user specific weighting, emerging trends in popular keywords, expert recommendations, etc. In one or more embodiments, the keyword recommendation algorithm selection sequence is selected from a number of pre-determined keyword recommendation algorithm selection sequences based on the GTP usage pattern. Specifically, each of these pre-determined keyword recommendation algorithm selection sequences is suitable for a particular combination of the aforementioned user specific usage pattern and keyword specific usage pattern associated with the particular user and the particular registered unique keyword. Examples of the keyword recommendation algorithm selection sequence and identifying a suitable selection sequence based on the GTP usage pattern are described in reference to FIG. 4A below.

In Step 204, a keyword recommendation algorithm is selected from the number of different keyword recommendation algorithms based on the keyword recommendation algorithm selection sequence identified in Step 203 and a previously selected keyword recommendation algorithm. In one or more embodiments, the previously selected keyword recommendation algorithm is tracked by a pointer to the keyword recommendation algorithm. Each time the selection is made from the keyword recommendation algorithm selection sequence, the pointer advanced to the next position to identify subsequent keyword recommendation algorithm for selection. Examples of selecting a keyword recommendation algorithm based on the keyword recommendation algorithm selection sequence is described in reference to FIG. 4A below.

In Step 205, using the keyword recommendation algorithm selected in Step 204, the GTP usage pattern is analyzed based on the particular registered unique keyword to select a recommended keyword from the many registered unique keywords of the GTP.

In one or more embodiments, the selected keyword recommendation algorithm is based on keyword usage statistics across all GTP users. For example, this keyword recommendation algorithm is suitable in the scenario when user specific usage statistics of the particular user is not available. In such embodiments, the selected keyword recommendation algorithm is based on comparing similarity of how all GTP users use the particular registered unique keyword and how all GTP users use any other registered unique keyword. Accordingly, a recommended keyword is selected if its similarity measure with respect to the particular registered unique keyword meets a pre-determined criterion.

In one or more embodiments, the similarity measure between the particular registered unique keyword and another registered unique keyword is determined by analyzing the GTP usage pattern. In one or more embodiments, the similarity measure represents similarity between relative usage levels of the particular registered unique keyword by various users and relative usage levels of another registered unique keyword used by the same set of users. For examples, two registered unique keywords are considered to be similar if they are both frequently used by some users and both less frequently used by other users. In contrast, two registered unique keywords are considered to be non-similar if no correlation can be found in frequent usages by common users. In one or more embodiments, such similarity measure is referred to as a pair-wise keyword similarity measure. An example of the keyword recommendation algorithm based on the pair-wise keyword similarity measure is described as [R1] module in reference to FIG. 4A below.

In one or more embodiments, the selected keyword recommendation algorithm is based on a combination of keyword usage statistics across all GTP users and keyword usage statistics specific to the particular user. For example, this keyword recommendation algorithm is suitable in the scenario when user specific usage statistics of the particular user is available. In one or more embodiments, the keyword usage statistics specific to the particular user is based at least on the particular registered unique keywords. In one or more embodiments, the selected keyword recommendation algorithm is based on a weighted sum of all pair-wise keyword similarity measures associated with those registered unique keywords that have been used by the particular user within a pre-determined time period. For example, the weighted sum may be based on a most recent time period, such as most recent 3 days, most recent 5 days, etc. In another example, the weighted sum may be based on those registered unique keywords that have been used by the particular user for at least a pre-determined minimum number of times during the pre-determined time period. In yet another example, the weighted sum may be based on a pre-determined number of registered unique keywords that have most recently been used by the particular user. In these embodiments, a recommended keyword is selected if the weighted sum meets a pre-determined criterion. An example of the keyword recommendation algorithm based on the keyword usage statistics specific to the particular user is described as [R2] module in reference to FIG. 4A below.

In one or more embodiments, the selected keyword recommendation algorithm is based on an emerging usage pattern of the GTP users using the many registered unique keywords to access content from the GTP. Specifically, a rate of usage increase is determined for each registered unique keyword of the GTP. The rate of usage increase represents increase in usage levels of all GTP users using each registered unique keyword over a pre-determined recent time period. Accordingly, a registered unique keyword having rate of usage increase meeting a pre-determined criterion is selected as the recommended keyword. An example of the keyword recommendation algorithm based on the emerging usage pattern is described as [R3] module in reference to FIG. 4A below.

In one or more embodiments, the selected keyword recommendation algorithm is based on experts' recommendations. Specifically, each registered unique keyword may be assigned a pre-determined ranking indicating the experts' opinion of the keyword's level of relevance. Accordingly, a registered unique keyword is selected as the recommended keyword if its assigned pre-determined ranking meets a pre-determined criterion. An example of the keyword recommendation algorithm based on the experts' recommendations is described as [R4] module in reference to FIG. 4A below.

In one or more embodiments, the selected keyword recommendation algorithm is adjusted based on how previously recommended keywords have been adopted. For example, a recommendation adoption pattern may be determined to represent a level of adoption of each previously provided keyword recommendation by all GTP users as a whole. In another example, a recommendation adoption pattern may be determined to represent a level of adoption of each previously provided keyword recommendation by the particular user singularly. In one or more embodiments, the selected keyword recommendation algorithm is adjusted based on the recommendation adoption pattern.

For example, the selected keyword recommendation algorithm may be adjusted such that well adopted (i.e., well known) keywords do not show up as irrelevant recommendations. In another example, the selected keyword recommendation algorithm may be adjusted such that a well adopted (i.e., well known) keyword by many GTP users yet unknown to the particular user is recommended to the particular user.

In Step 206, the recommended keyword, as selected in Step 205, is sent to the GTP. Accordingly, in response to the user message sent by the user to the GTP, the GTP sends to the user a GTP message containing user requested textsite information followed by a keyword recommendation that identifies the recommended keyword. In one or more example, the keyword recommendation includes the recommended keyword (or a representation thereof) and a description of content accessible using the recommended keyword. Example GTP messages containing keyword recommendation to introduce recommended keywords to the user are described in reference to FIGS. 4B-4E below.

Figure 2B:
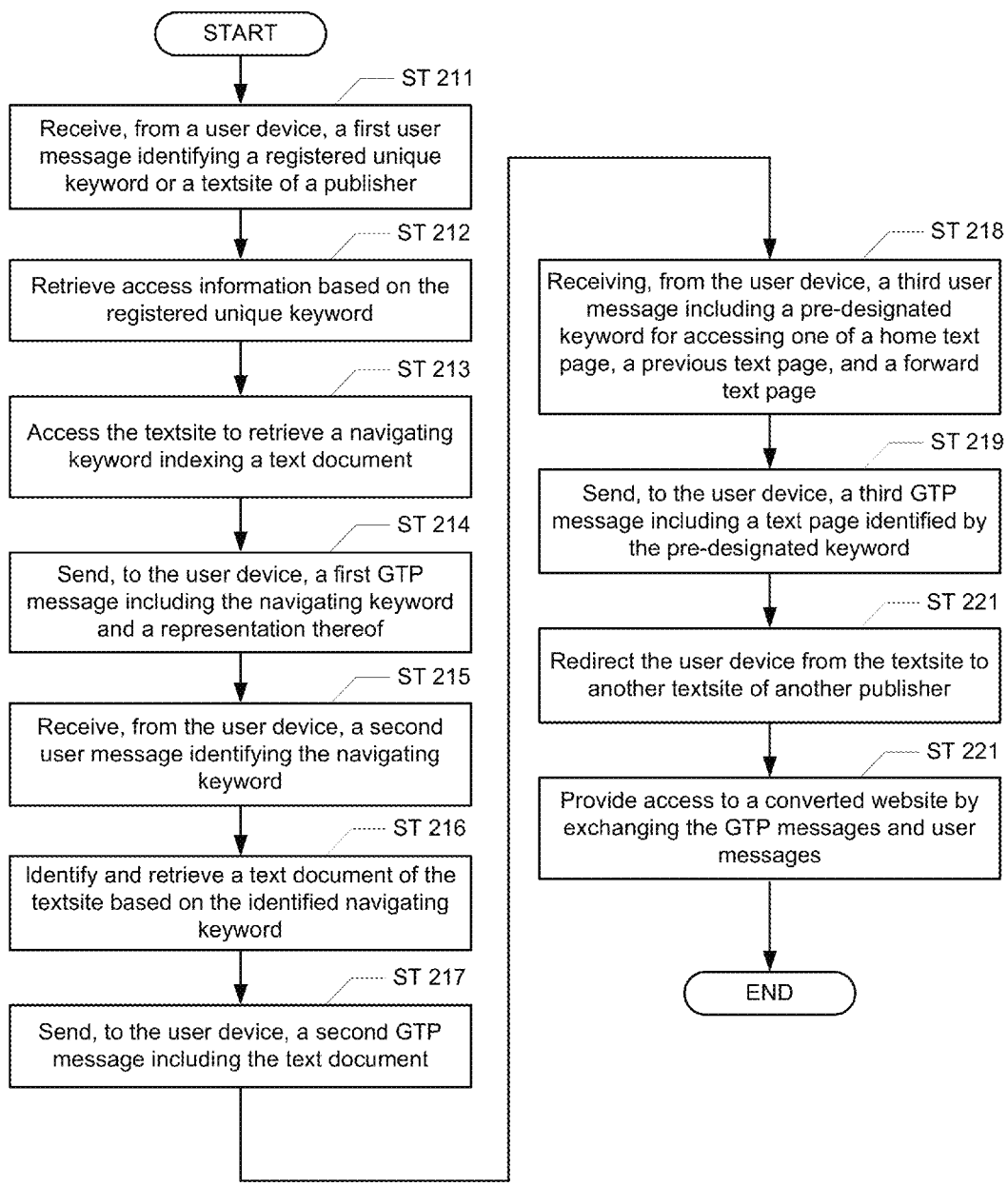

FIG. 2B shows a flow chart for accessing content of one or more textsites in accordance with one or more embodiments of the invention. More specifically, FIG. 2B shows a flow chart describing the process for accessing content from the global textsite platform (GTP) perspective, in which the platform provides users (i.e., users accessing content authored by publishers) with access to content maintained in the form of textsites by the GTP. In one or more embodiments of the invention, the method of FIG. 2B may be practiced using the GTP described in reference to FIG. 1B above. In one or more embodiments of the invention, one or more of the steps shown in FIG. 2B may be omitted, repeated, and/or performed in a different order than that shown in FIG. 2B. Accordingly, the specific arrangement of steps shown in FIG. 2B should not be construed as limiting the scope of the invention.

Initially in ST 211, a first user message is received, from a user mobile device that identifies a registered unique keyword maintained by the GTP. As described above, the registered unique keyword may be registered with the GTP by a publisher of a textsite identified by the registered unique keyword while the user device may be a mobile phone or other computing devices. By sending the registered unique keyword in the first user message, the user is requesting access to (i.e., to browse) the textsite associated with the registered unique keyword. In one or more embodiments of the invention, the GTP and/or the publisher may distribute an advertisement containing the registered unique keyword in a commercial promotion. Accordingly, the user may obtain the registered unique keyword from the advertisement. Alternatively, in one or more embodiments of the invention, the GTP may send, in response to receiving a request from the user device, a GTP message identifying a number of sample registered unique keywords from which the user may select a particular one to be included in the first user message. For example, the sample registered unique keywords may be registered with the GTP by a number of different publishers. In one or more embodiments, the request for a listing of registered unique keywords may be received from the user device in a second user message containing a pre-designated keyword defined specifically for requesting such a listing. Alternatively, in one or more embodiments, the user may request such a listing by simply making a conversationless call to the phone number of the GTP instead of sending the second user message to the same phone number. Using any of the approaches described above, the user may obtain a list of textsites accessible via the GTP using a single phone number (e.g., a local phone number) provided by the GTP according to a geographical location of the user. Accordingly, the user is not required to separately obtain and keep different phone numbers for accessing different textsites using a TMS.

In ST 212, authored content (e.g., access information) associated with the textsite requested by the user is retrieved based on the registered unique keyword extracted from the first user message received at the GTP. In one or more embodiments of the invention, the GTP maintains a registry containing an entry for each registered unique keyword that holds pertinent information of the textsite such as location, network address, access path, and other suitable metadata associated with the textsite. Accordingly, the access information associated with the user requested textsite may be retrieved. For example, such access information may determine whether the requested textsite is hosted on a server of the GTP or a third party server separate from the GTP.

In ST 213, the textsite is accessed based on the retrieved authored content (e.g., access information) to retrieve a navigating keyword. For example, a portion of the navigating keywords of the textsite may be retrieved. In another example, the navigating keyword may be retrieved by retrieving a home text page from the textsite that contains the navigating keyword. Generally speaking, the navigating keyword may be an alphanumeric string (e.g., location, Pita Wraps, Panini, Entrees, etc.) that is meaningful to the user but requires many keys to enter into the user device while the other navigating keyword may be a short string (e.g., loc, PW, P, E, 1, 2, 3, etc.) that is easy to enter but less meaningful to the user for selection. To assist the user in selecting a navigating keyword from a GTP message and to key in the selected navigating keyword when composing a reply user message, a cryptic navigating keyword (e.g., loc, PW, P, E, 1, 2, 3, etc.) may be associated with a meaningful label (e.g., location, Pita Wraps, Panini, Entry, etc.) and displayed together (e.g., loc>location, PW>Pita Wraps, P>Panini, E>Entrees, 1>location, 2>Pita Wraps, 3>Panini, etc.) in the text page delivered via the GTP message. Similarly, a meaningful navigating keyword (e.g., location, Pita Wraps, Panini, Entry, etc.) may be associated with a short hand identifier (e.g., loc, PW, P, E, 1, 2, 3, etc.) and displayed together (e.g., loc>location, PW>Pita Wraps, P>Panini, E>Entrees, 1>location, 2>Pita Wraps, 3>Panini, etc.) in the text page delivered via the GTP message. The meaningful label and the short hand identifier are referred to as a representation of the navigating keyword. In one or more embodiments, representations of the navigating keyword may also include formats different from the meaningful label and/or the short hand identifier.

In ST 214, a first GTP message containing the retrieved navigating keyword is sent to the user device in response to receiving the first user message. In one or more embodiments, the first GTP message includes the retrieved portion of the textsite navigating keywords. In one or more embodiments, the first GTP message includes the text page containing the retrieved navigating keyword. For example, the home text page of the textsite may be sent to the user device in the first GTP message as a reply to the first user message containing the registered unique keyword. Accordingly, the user may access a desired text page from the home text page by selecting a corresponding navigating keyword contained in the home text page. In one or more embodiments, a text page also contains, as defined by the publisher, representations of included navigating keywords for ease of user selection. For example, each of the navigating keywords in the home text page sent in the first GDP message may be accompanied by a meaningful label or a short hand identifier. Accordingly, the user may specify (or identify) a desired text page by including either a corresponding navigating keyword or a representation of such navigating keyword in a second user message replying to the first GTP message. In ST215, this second user message is received at the GTP.

As noted above, navigating keyword information (e.g., access information such as location, address, or other information enabling access to a text page pointed to by a navigating keyword) and navigation paths to text pages in the textsite are stored in the textsite map. In one or more embodiments of the invention, information regarding meaningful labels, short hand identifiers, or other keyword representations for a navigating keyword in a text page is also included in the textsite map. For example, such information includes the aforementioned dynamically assigned link and dynamically assigned keyword identifier described in reference to FIGS. 1A and 2A above. In ST 216, the desired text page is identified according to the textsite map based on either the navigating keyword or a representation (e.g., a meaningful label, short hand identifier) thereof extracted from the second user message. Further, the desired text page is retrieved by looking up access information in the textsite map accordingly.

In ST 217, the desired text page is included in a second GTP message and sent, as reply to the second user message, to the device for display to the user.

In ST 218, a third user message is received from the device while displaying the first text page. The third user message includes a pre-designated keyword (e.g., ";" "0," "," etc.). For example, the pre-designated keyword may be defined specifically for accessing a home text page of the textsite. In response, the GTP sends the home text page to the device in a third GTP message (ST 219). In another example, the pre-designated keyword may be defined specifically for accessing a previous text page sent to the device prior to the text page in a navigation trace. An example navigation trace is described with reference to FIGS. 3A-3J below. In response, the GTP sends the previous text page to the device in the third GTP message (ST 219). In still another example, the pre-designated keyword may be defined specifically for accessing a forward text page sent to the device subsequent to the text page in the navigation trace. In response, the GTP sends the forward text page to the device in a third GTP message (ST 219). In yet another example, the pre-designated keyword may be defined specifically for subscribing to updates of a currently displayed text page. In response, the GTP sends updated versions of the currently displayed text page in a push mode to the device from time to time in recurring GTP messages (ST 219).

While the description above regarding ST 211 through ST 219 relates to a textsite published by a publisher under a registered unique keyword, the user may obtain another registered unique keyword separately registered with the GTP by another publisher of another textsite. During navigation of the currently displayed textsite, a user message may be received identifying a second registered unique keyword. For example, such user message may include either the second registered unique keyword or a representation thereof. In response, the GTP redirects the user device from the currently navigated textsite to the second textsite (ST 220). Accordingly, the GTP may exchange text messages with the device for navigating the second textsite using a second set of navigating keywords according to a second textsite map of the second textsite. Accordingly, in one or more embodiments, the user may switch back and forth between different textsites published by different publishers without the need to change the phone number to which the text messages are sent in the middle of the textsite navigation.

As described above, there are several different approaches as to how a user may obtain a list of all textsites accessible via the GTP regardless of which publisher authored the content. An additional scenario in which the user may obtain additional registered unique keywords is from a text page having an embedded external link, as authored by the publisher and is consistent with the textsite map. In this scenario, a user message may be redirected to a second or third textsite as described above. Further, the text page may include a short hand identifier for the embedded external link in which case the user message may just include the short hand identifier for quick redirection.

In some scenarios, the second textsite described above is converted from a website, for example, using the adaptor described in reference to FIG. 1B above. In such scenarios, the second navigating keyword may be registered for the website where a corresponding registry entry specifies a particular adaptor plug-in for use to map between a website map of the website and a textsite map converted from the website map. Specifically, a navigating keyword received in a user message during navigation of the converted website is processed using the textsite map, the adaptor plug-in, and the website map to retrieve access information associated with a corresponding webpage. Subsequently, the webpage may be retrieved and converted dynamically (i.e., on demand) into a text page for sending to the user device. Alternatively, a pre-converted text page may be stored and retrieved for sending to the user device (ST 221).

Examples of screenshots detailing what a user text message and a response from the global textsite platform may look like are described in reference to FIGS. 3A-3J below.

FIGS. 3A-3J show various screenshots illustrating examples of accessing content hosted by a global textsite platform in one or more embodiments of the invention. Although FIGS. 3A-3J show implementation examples of embodiments of the invention, those skilled in the art will appreciate that there may be other ways in which to implement embodiments of the invention, and that the example screenshots are not meant to limit the scope of the invention. Throughout FIGS. 3A-3J, a text page delivered in a GTP message and the GTP message delivering the text page may both be referred to using the same reference numerals.

Figure 3A:
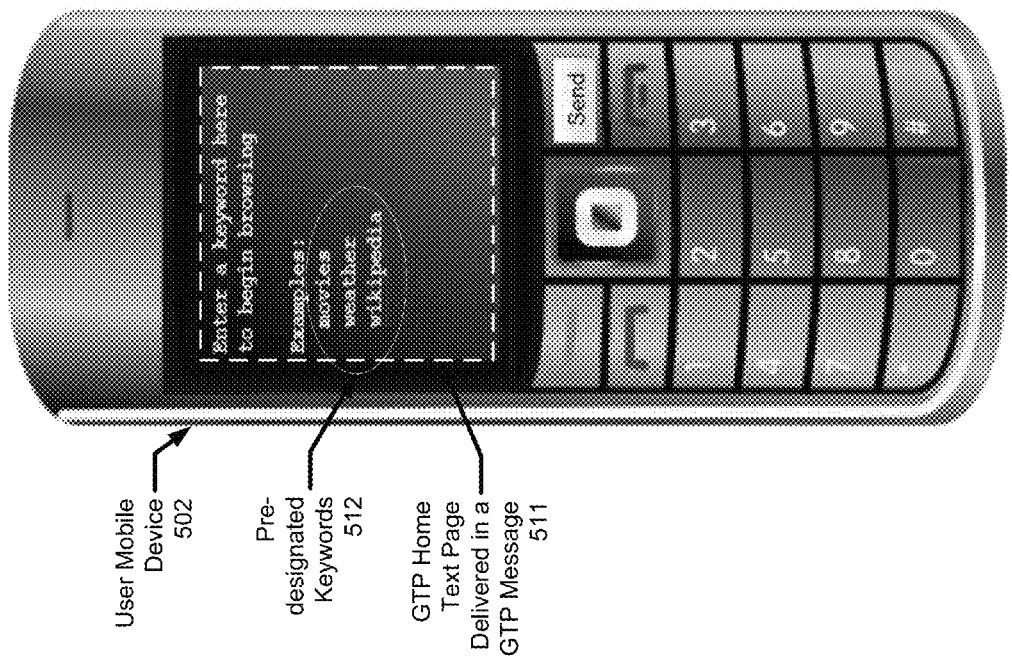
FIGS. 3A-3J show screenshots of an example in accordance with one or more embodiments of the invention.
Figure 3A:
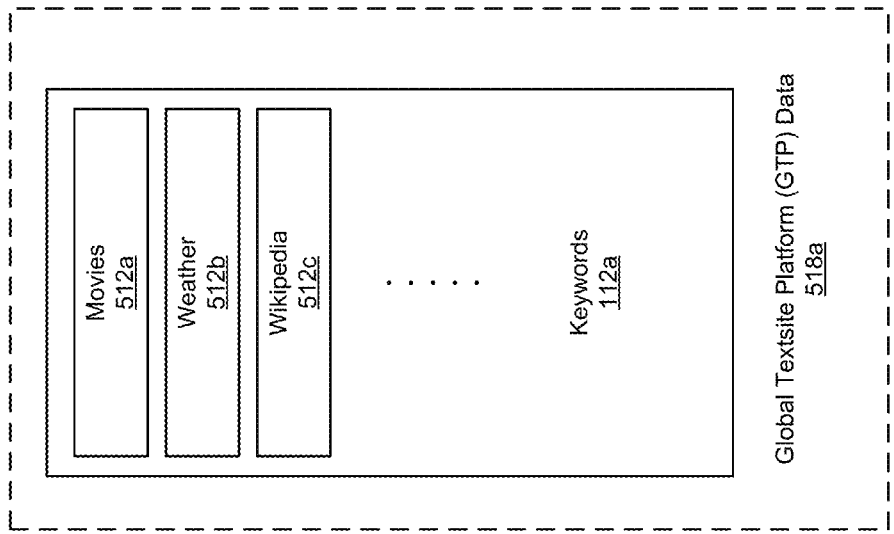

FIG. 3A shows the user mobile device (502) displaying an example GTP home text page, which is delivered via TMS in a GTP message (511). As noted above, this GTP home text page may be sent in the GTP message (511) in response to a request from a user. For example, the user may send a request message in a pre-designated format (e.g., with blank content or with content associated with another pre-designated keyword) using a phone number of the GTP to request the GTP home text page. In another example, the user may have made a conversationless telephone call to the phone number of the GTP to request the GTP home text page. As shown in FIG. 3A, the GTP home text page includes pre-designated keywords (512) listed as movies, weather, and Wikipedia. For example, these pre-designated keywords are stored in the keywords (112a) of GTP data (518a) corresponding to the keywords (112) shown in FIG. 1B above. The keywords (112a) includes pre-designated keyword entries of movies (512a), weather (512b), and Wikipedia (512c) corresponding to sample textsites or generic textsites included in and/or hosted by the GTP.

Figure 3B:
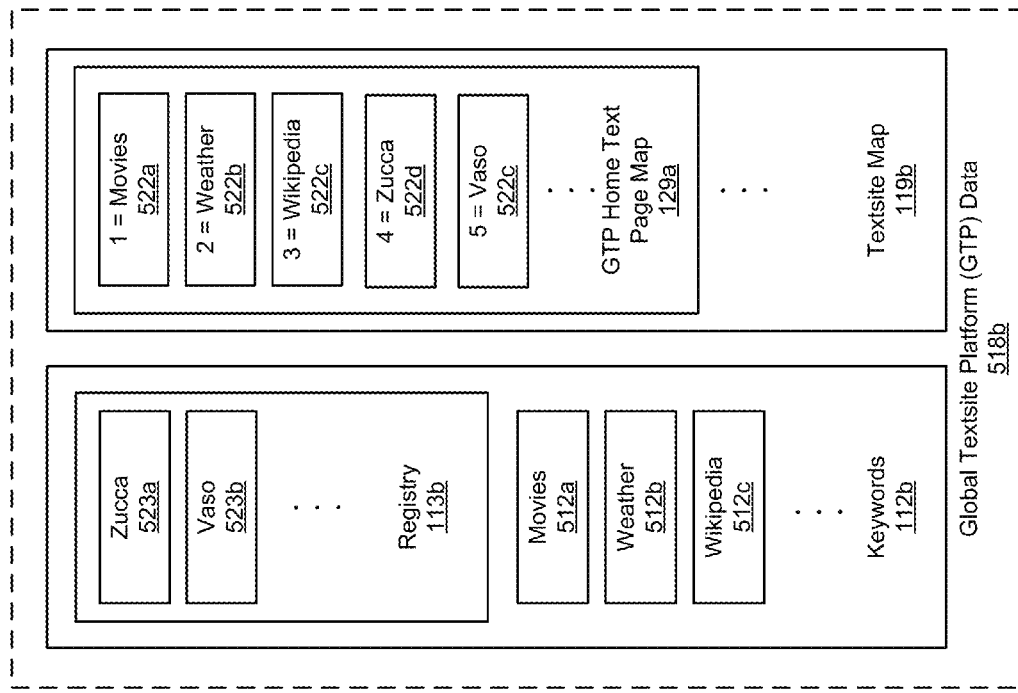
Figure 3B:
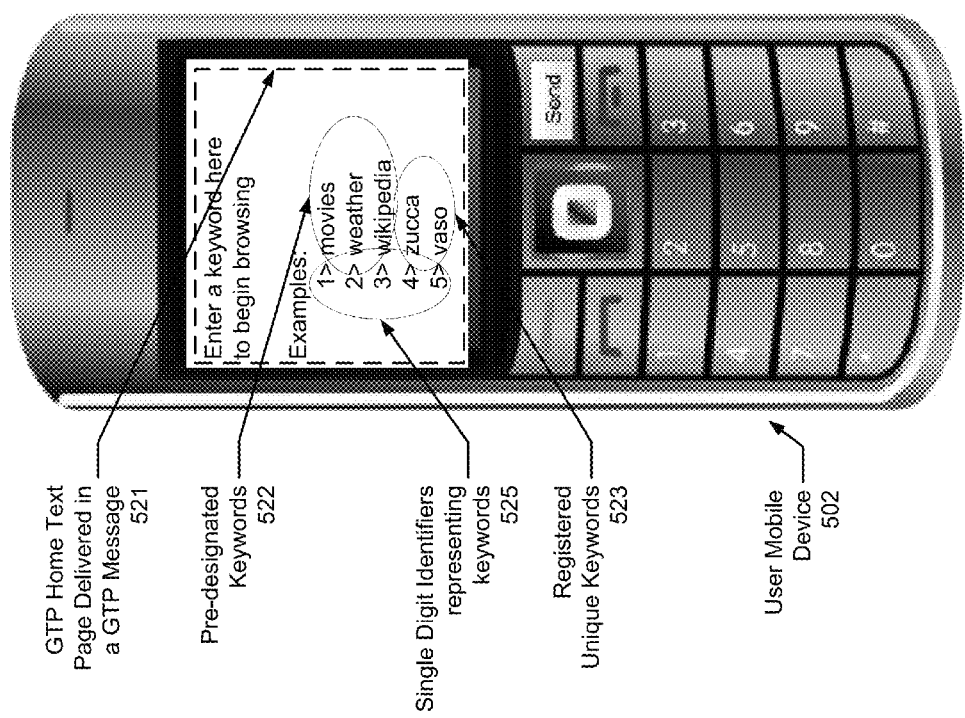

FIG. 3B shows the user mobile device (502) displaying another example GTP home text page delivered in a GTP message (521), which may be requested and delivered in essentially the same way as the example GTP home text page described in reference to FIG. 3A above. In the example GTP home text page shown in FIG. 3B, the pre-designated keywords (522) are essentially the same as the pre-designated keywords (512) described above while followed by registered unique keywords (523) listed as zucca and vaso. Accordingly, keywords (112b) of the GTP data (518b) include a registry (113b) in addition to the pre-designated keyword entries movies (512a), weather (512b), and wikipedia (512c). As shown, the registry (113b) includes keyword entries zucca (523a) and vaso (523b), which are linked to access information (not shown) to the respective textsites associated with those keywords.

Further as shown in FIG. 3B, short hand identifiers (525) (i.e., 1, 2, 3, 4, and 5) are displayed next to and represent pre-designated keywords (522) and registered unique keywords (523) for user selection in the example GTP home text page delivered in the GTP message (521). For example, zucca and vaso of the registered unique keywords (523) correspond to a restaurant textsite and a bookstore textsite, respectively.

As described above, the user may include either the keyword "zucca" or the corresponding short hand identifier "4" when replying to the GTP message (521) to access the restaurant textsite. To facilitate this, a textsite map (119b) of the GTP data (518b) includes GTP home text page map (129a) containing entries (e.g., entry (522a) through entry (522e), etc.) for describing representations of the keywords using the short hand identifiers (525) and for describing access information authored for the respective textsites.

As described above, the registered unique keywords zucca and vaso may be registered with the GTP by the respective restaurant and bookstore owners who created their own textsites or registered by contracted publishers on their behalf. Further, the zucca textsite may be hosted on a server of the GTP while the vaso textsite may be hosted on a third party server separate from the GTP.

Figure 3F:
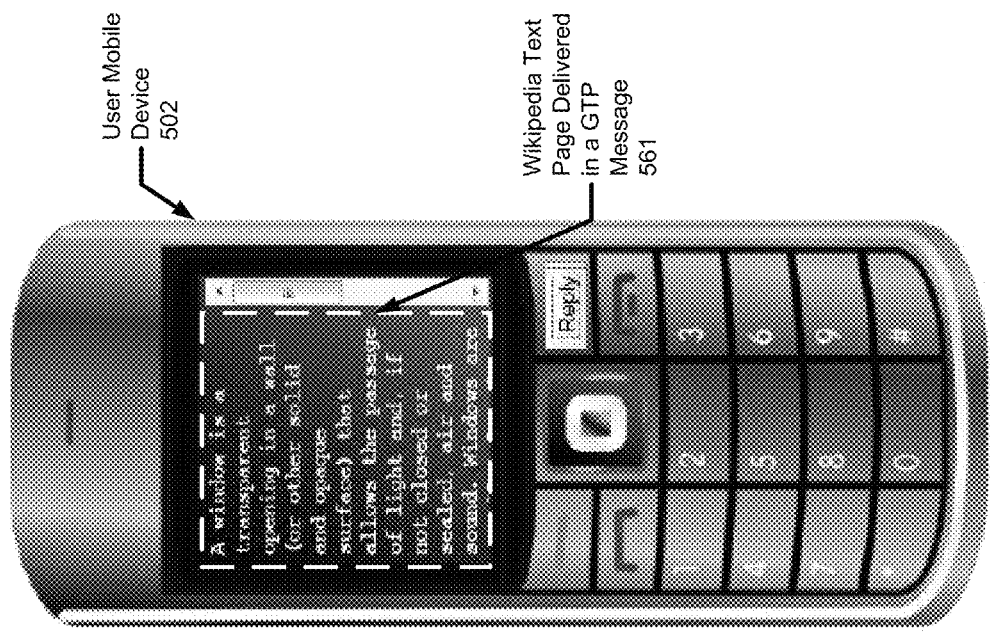
Figure 3C:
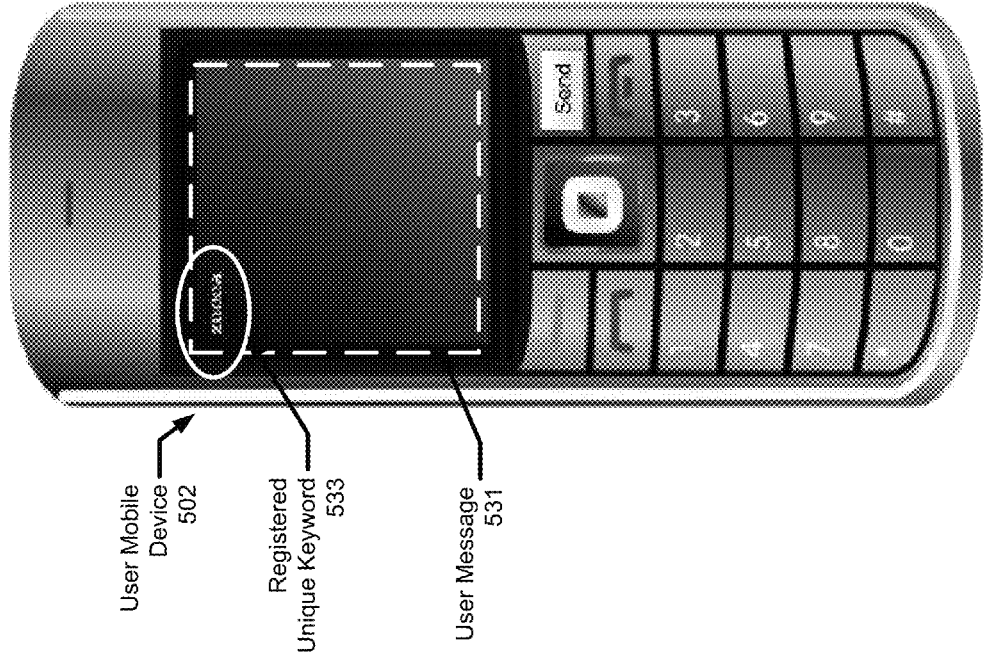

FIG. 3C shows the user mobile device (502) displaying an example user message (531) containing the registered unique keyword (533) (i.e., zucca) as selected by the user from the example GTP home text page shown in FIG. 3B above. Alternatively, the registered unique keyword (533) may be obtained by the user from an advertisement distributed, for example, by restaurant zucca in a commercial promotion.

Figure 3D:
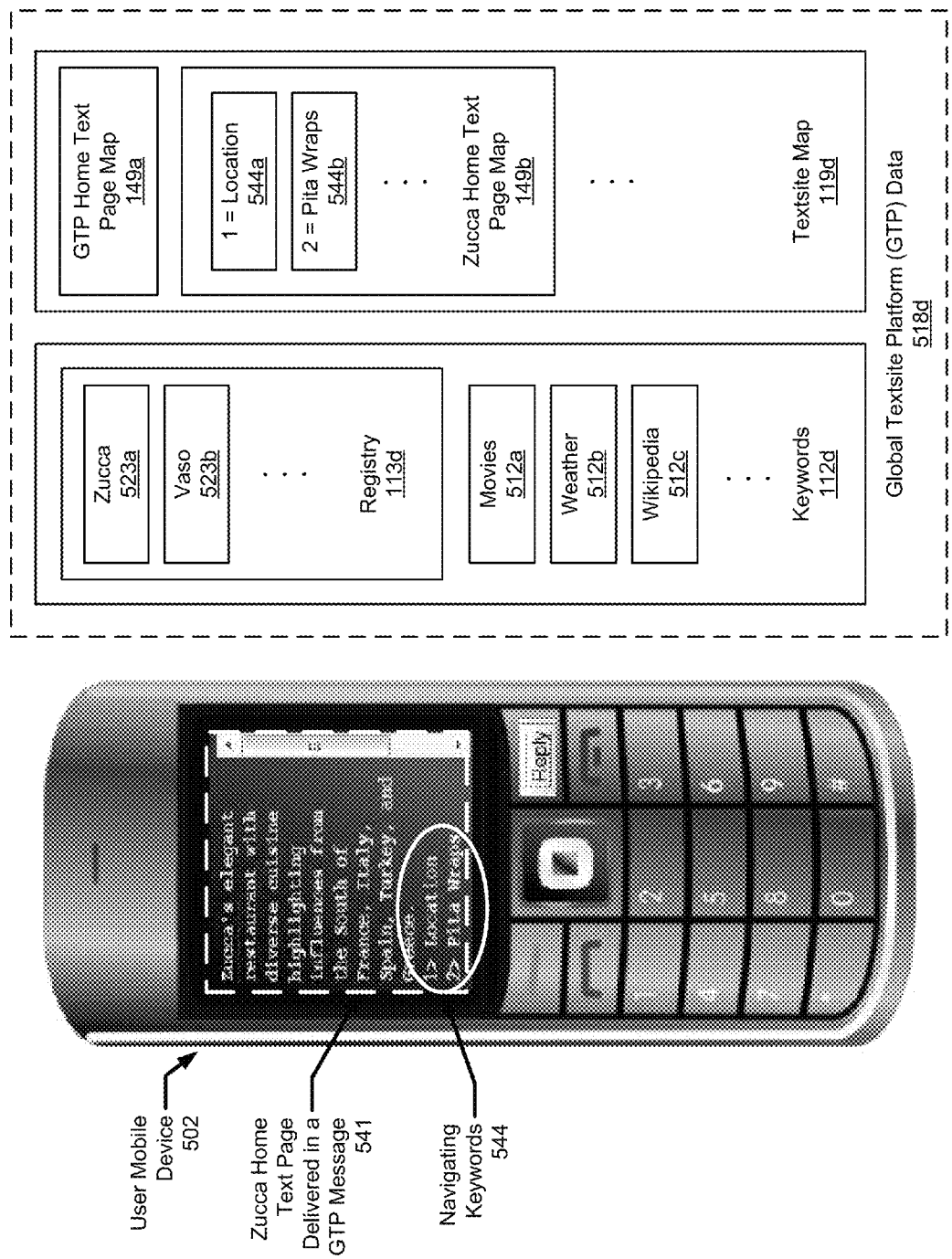

FIG. 3D shows the user mobile device (502) displaying an example home text page of the textsite for restaurant Zucca, which is delivered in a GTP message (541) in response to the user message (531) described above. As shown, the example zucca home text page includes navigating keywords and representations thereof (544) listed as "1>location" and "2>pita wraps." For example, "1" may be considered the navigating keyword while "location" is the meaningful label. Alternatively, "location" may be considered the navigating keyword while "1" is the short hand identifier. In either case, the aforementioned navigating keywords and representations thereof are displayed together for user selection in the zucca home text page. In the example shown in FIG. 3D, the GTP data (518d) is essentially the same as the GTP data (518b) shown in FIG. 3B above with an additional zucca home text page map (e.g., entry (544a), entry (544b), etc.) included in the textsite map (119d). For example, the GTP home text page map (149a) is essentially the same as the GTP home text page map (129a) shown in FIG. 3B above. As described above, the zucca home text page map (149b) contains entries for describing representations of the navigating keywords using the meaningful labels or short hand identifiers within the zucca home text page and for describing access information for respective text pages referenced by the navigating keywords. For example, including either the navigating keyword or the corresponding representation (i.e., either one of "location" or "1") in a user message replying to the GTP message (541) results in a text page containing address and driving direction information of the zucca restaurant being identified by the GTP. The address and driving direction information (i.e., the authored content for the text page associated with the navigating keyword (i.e., "location" or "1") is then delivered to the user mobile device (502) in a subsequent GTP message. As described above, the representation of navigating keywords (544) using meaningful labels or short hand identifiers and the use of navigating keywords (544) to index the respective text pages are applicable only within the displayed text page, which is the zucca home text page, in this instance. Said another way, and as illustrated in FIGS. 3G and 3H below, the keyword "location" or "1" may be associated with different effects when used in a context other than replying to a GTP message delivering the zucca home text page.

Figure 3E:
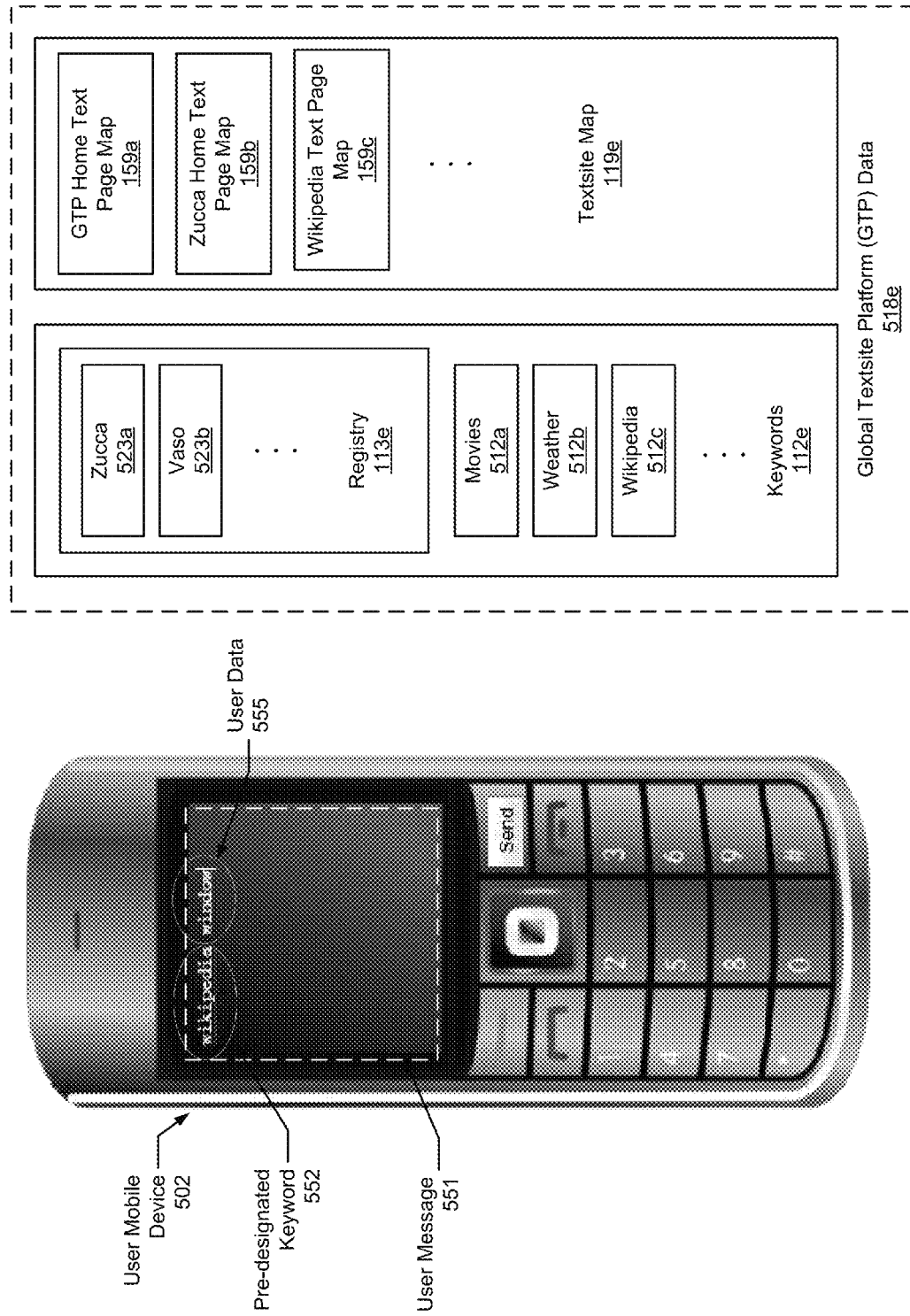

FIG. 3E shows the user mobile device (502) displaying an example user message (551) containing the pre-designated keyword (552) (i.e., Wikipedia) as selected by the user from the example GTP home text page shown in FIG. 3B above or otherwise obtained by the user from an advertisement distributed, for example, by an operator of the GTP promoting built-in features of the GTP. As shown in FIG. 3E, the pre-designated keyword (552) (i.e., Wikipedia) is followed by user data (555) (i.e., "window") in the user message (551) to initiate a search for information relating to user data (555) (i.e., "window") within the Wikipedia textsite. To facilitate this, textsite map (119*e*) of the GTP data (518*e*) includes Wikipedia text page map (159*c*) describing relevant syntax information applicable to the Wikipedia textsite. For example, the Wikipedia text page map (159*c*) may relate to a home text page or a text page other than the home text page of the Wikipedia textsite. The GTP home text page map (159*a*) and Zucca home text page map (159*b*) are essentially the same as the GTP home text page map (149*a*) and Zucca home text page map (149*b*) shown in FIG. 3D above.

FIG. 3F shows the user mobile device (502) displaying an example wikipedia text page delivered in a GTP message (561) responding to the user message (531) described above. As shown, the example wikipedia text page contains search result relating to the user data (555) (i.e., "window").

Figure 3G:
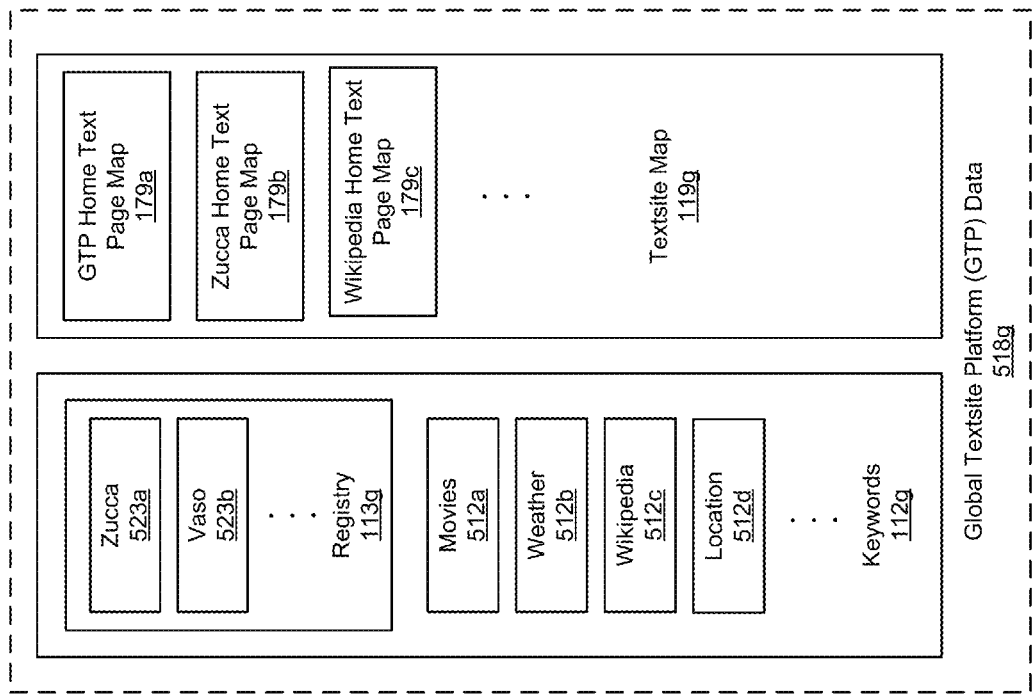
Figure 3G:
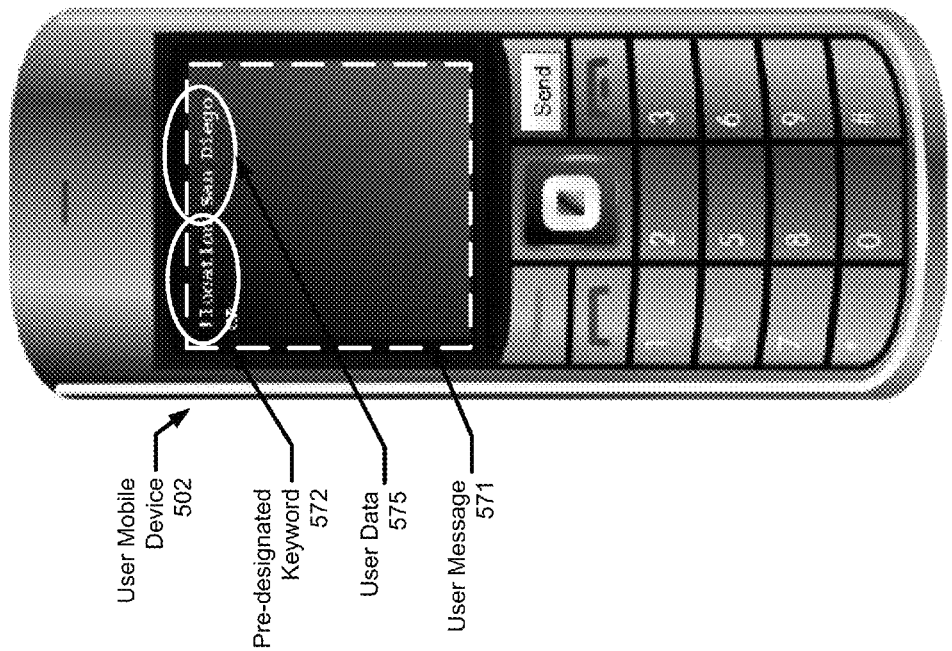
Figure 3H:
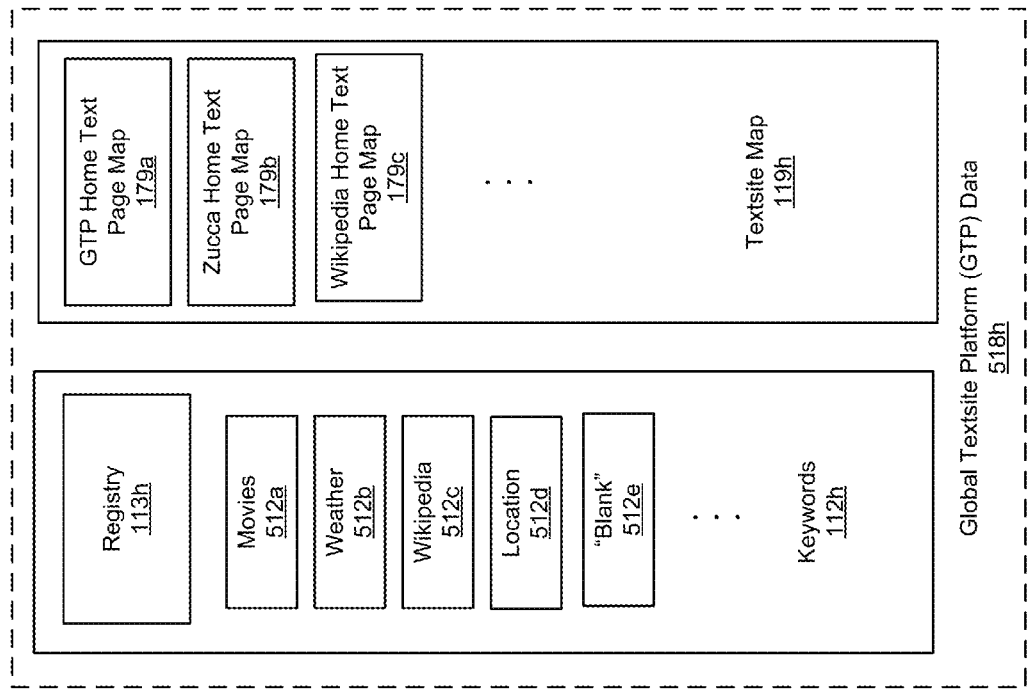
Figure 3H:
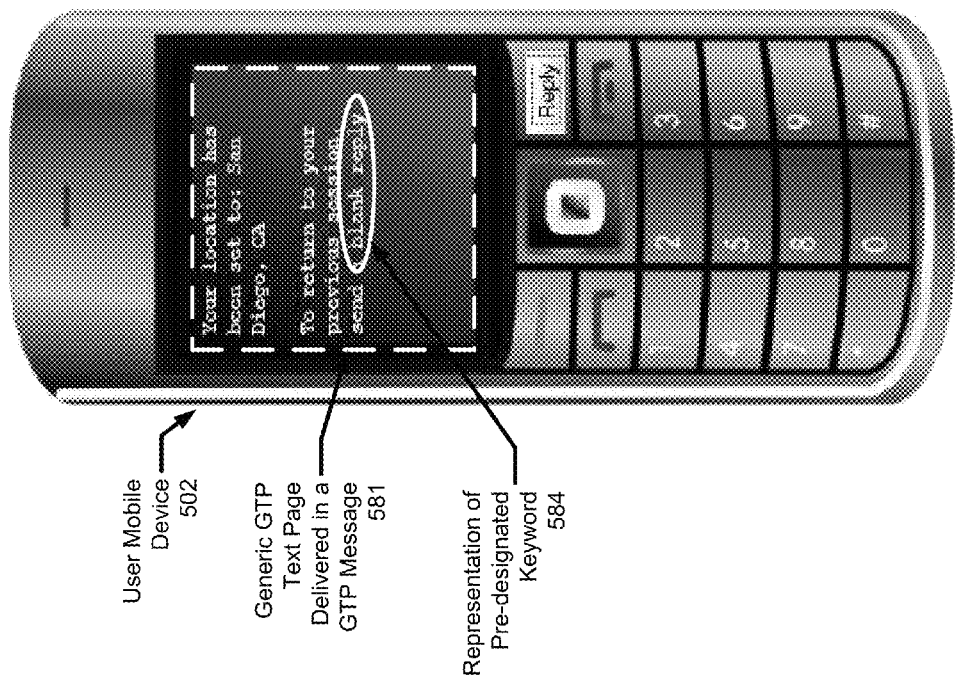

FIG. 3G shows the user mobile device (502) displaying an example user message (571) containing the pre-designated keyword (572) (i.e., location, as reflected by the entry location (512*d*) in keywords (112*g*) of the GTP data (518*g*)), for example obtained by the user in a GTP user guide (e.g., online user guide). As shown in FIG. 3E, the pre-designated keyword (572) (i.e., location) is followed by user data (575) (i.e., "San Diego") in the user message (571) to set a global user location parameter throughout the GTP. Accordingly, for example and as described in FIGS. 3I and 3J below, a textsite registered with the GTP may utilize this global user location parameter set by the user for performing related activities, such as searching for weather information associated with the user location reflected in this global user location parameter. In another example, the textsite may overwrite this global user location parameter by a locally defined location keyword, as described in FIG. 3D above. The GTP home text page map (179*a*), Zucca home text page map (179*b*), and Wikipedia home text page map (179*c*) are essentially the same as the GTP home text page map (159*a*), Zucca home text page map (159*b*), and Wikipedia home text page map (159*c*) shown in FIG. 3E above.

FIG. 3H shows the user mobile device (502) displaying an example GTP text page delivered in a GTP message (581) responding to the user message (571) described above. As shown, the example GTP text page contains confirmation to the user data (575) (i.e., "San Diego") and navigating tips describing a pre-designated keyword " " represented by the word "blank" (584) as reflected by the entry "blank" (512*e*) in keywords (112*h*) of the GTP data (518*h*). Based on the displayed navigating tips, the GTP may identify a previous session (e.g., a previous text page) from a user navigation trace for delivering to the user mobile device (502) upon receiving a user message containing the pre-designated keyword " " represented by the word "blank" (584). An example user navigation trace is the sequence of textsites traversed by the user as illustrated in FIGS. 3A through 3G above, which may be tracked by the GTP for assisting user textsite navigation. Other examples of pre-designated navigating keywords or syntax associated with the GTP may include a globally reserved single text digit (e.g., "0") or text string (e.g., ".") used for re-directing to a home page of the currently displayed textsite, a forward text page in the user navigation trace, or other pre-defined text pages. Similar to the use of the pre-designated keyword "location" (572), such pre-designated navigating keywords (e.g., ",", "0," ".," etc.) may be utilized or overwritten by a textsite based on syntax information defined in a corresponding textsite map by the publisher. The textsite map (119*h*) is essentially the same as the textsite map (119*g*) as shown in FIG. 3G above.

Figure 3J:
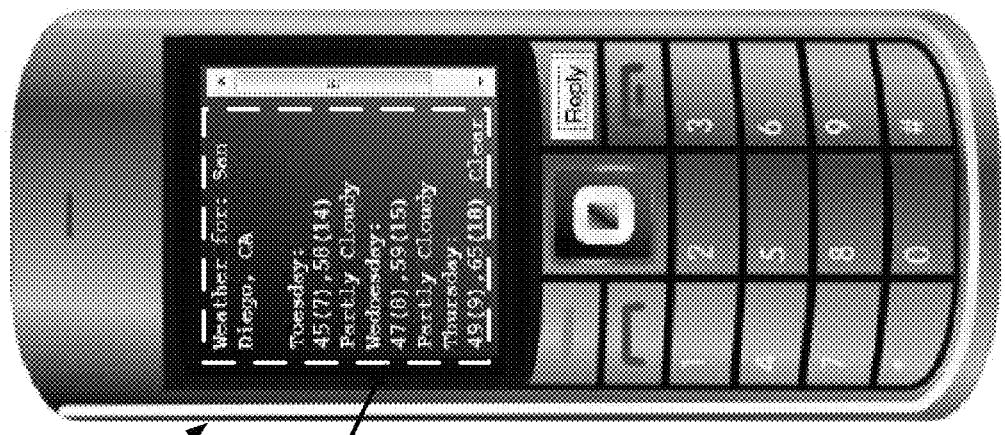
Figure 3I:
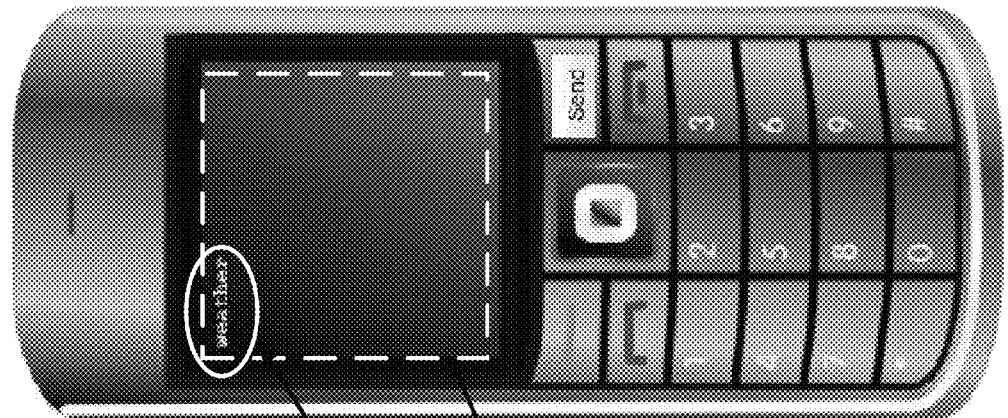

FIG. 3I shows the user mobile device (502) displaying an example user message (591) containing the pre-designated keyword (592) (i.e., weather) as selected by the user from the example GTP home text page shown in FIG. 3B above or otherwise obtained by the user from an advertisement distributed, for example, by an operator of the GTP promoting built-in features of the GTP.

FIG. 3J shows the user mobile device (502) displaying an example weather text page maintained by the GTP, which is delivered in a GTP message (593) in response to the user message (591) described above. As shown, the example weather text page illustrate a customized home text page for the weather textsite defined by the global user location parameter described in FIGS. 3G and 3H above.

Figure 4A:
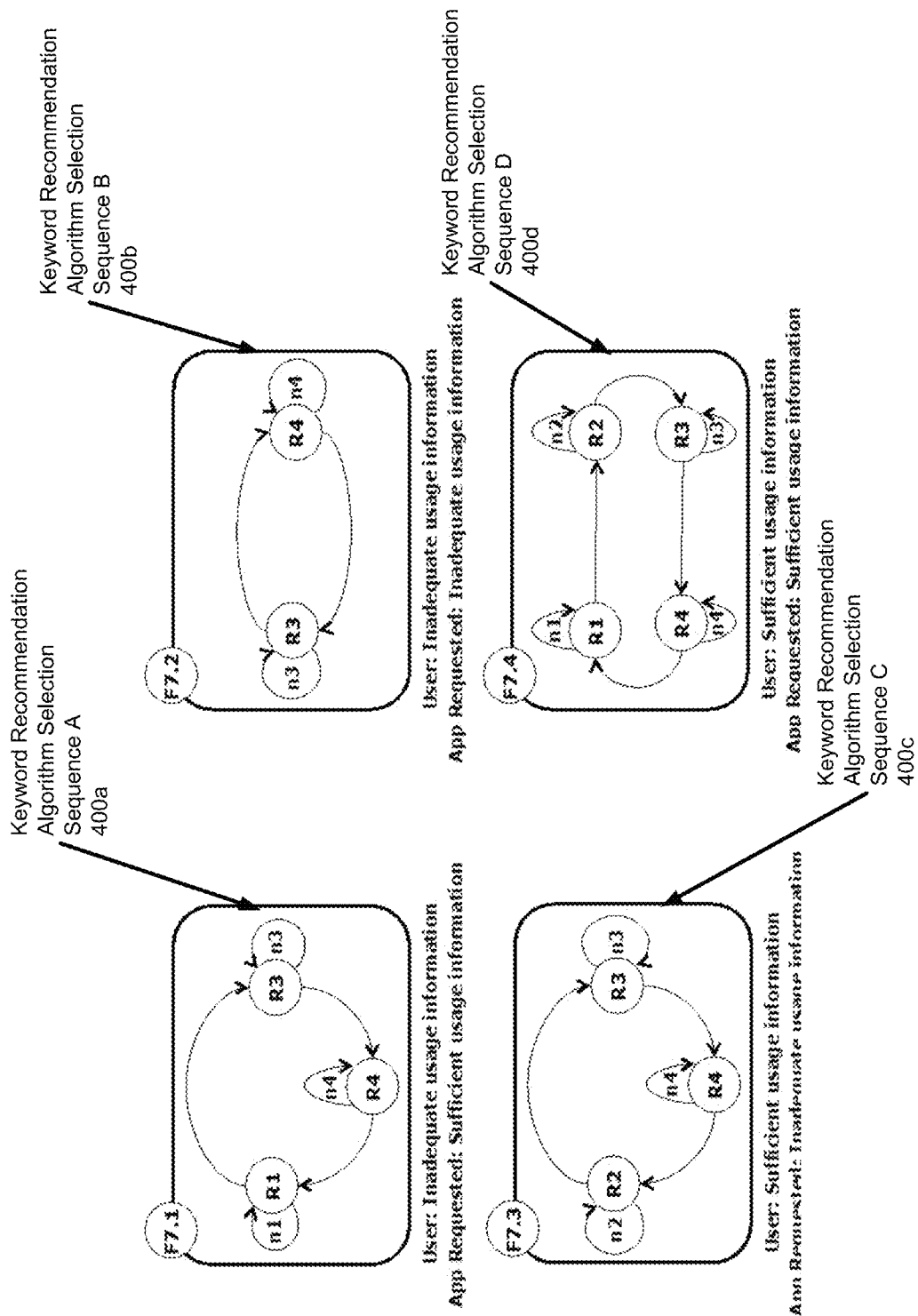
FIGS. 4A-4E show an example in accordance with one or more embodiments of the invention.

FIGS. 4A-4E show an example in accordance with one or more embodiments of the invention. Specifically, FIG. 4A shows examples of various keyword recommendation algorithm selection sequences, while FIGS. 4B-4E shows example screenshots of a user's cell phone illustrating keyword recommendation using an applicable keyword recommendation algorithm selection sequence.

As shown in FIG. 4A, examples of keyword recommendation algorithm selection sequences include the keyword recommendation algorithm selection sequence A (400*a*), the keyword recommendation algorithm selection sequence B (400*b*), the keyword recommendation algorithm selection sequence C (400*c*), and the keyword recommendation algorithm selection sequence D (400*d*). As noted above, depending on the usage level of the user using various registered unique keywords of the GTP and/or the usage level of all GTP users using the particular registered unique keyword submitted by the user, the keyword recommendation algorithm selection sequence may be adjusted. In particular, these keyword recommendation algorithm selection sequences shown in FIG. 4A represent different adjustments made to the algorithm selection sequence in four different usage level scenarios (i.e., scenario F7.1, scenario F7.2, scenario F7.3, and scenario F7.4). In other words, an applicable keyword recommendation algorithm selection sequence is selected from these keyword recommendation algorithm selection sequences shown in FIG. 4A depending on these usage level scenarios at the time when the user submits the particular registered unique keyword to request particular textsite content from the GTP. For example, the applicable keyword recommendation algorithm selection sequence may be selected by a hybrid business rule module, such as described in reference to FIG. 1A above.

Once the applicable keyword recommendation algorithm selection sequence is selected, each time when the user requests content from the GTP, the hybrid business rule module also selects a particular keyword recommendation algorithm from the applicable keyword recommendation algorithm selection sequence to generate recommended keyword that is relevant and personalized for the user. In the following description of FIG. 4A, the registered unique keyword may be referred to as "app request," and the textsite content may be referred to as "app." In this context, the textsite content requested from the GTP using the registered unique keyword may be referred to as "app being requested based on the app request," while the recommended keyword may be referred to as "recommended app." In addition, the keyword recommendation may be referred to as a "tip."

In the example shown in FIG. 4A, the hybrid business rule module may select one of four keyword recommendation algorithms, referred to as the modules [R1], [R2], [R3] and [R4], according to the applicable keyword recommendation algorithm selection sequence. Details of these four keyword recommendation algorithms [R1], [R2], [R3] and [R4] are described below.

[R1], also referred to as app-app recommendation, recommends a list of most similar apps for a given app based on the following steps R1.1-R1.3.

R1.1—Let $U_1, \ldots, U_n$ represent GTP users and $K_1, \ldots, K_m$ represent apps of the GTP. A user-app collaboration matrix $N=[N_{ij}]$ is generated where $N_{ij}$ is the number of times user $U_i$ has accessed the app $K_j$.

R1.2—The initial entries of the user-app collaboration matrix $N=[N_{ij}]$ are normalized with respect to each user to convert into a normalized user-app collaborating matrix $R=[R_{ij}]$, where $R_{ij}$ is the relative frequency of usage for an app $K_j$ by a given user $U_i$.

R1.3—The normalized user-app collaborating matrix is used to calculate the pair-wise cosine similarity between apps. For example, for app $K_1$ and $K_2$, the similarity $Sim(K_1, K_2)$ is cosine distance between vectors $\{R_{11}, R_{21}, \ldots, R_{n1}\}$ and $\{R_{12}, R_{22}, \ldots, R_{n2}\}$. In this manner, the similarity scores between all possible pair of apps are calculated to represent pair-wise app-app similarity for all apps of the GTP. Accordingly, for a given app Ks requested by the user, the other apps may be sorted by their similarity score (i.e., $Sim(K_s, K_1)$, $Sim(K_s, K_{s-1})$, $Sim(K_s, K_{s+1})$, $Sim(K_s, K_m)$) to select the most similar app(s) (irrespective of any user) as the recommendation.

[R2], also referred to as user-app recommendation, uses the pre-computed pair-wise app-app similarity to derive top-N suggested apps for a given user based on the user's usage level history. For example, the user $U_i$ has used only app $K_1$ and $K_2$ in the past. The user specific similarity score for an unused app K3 is calculated as $(Sim(K_3,K_1)*R_{i1}+Sim(K_3,K_2)*R_{i2})/(Sim(K_3,K_1)+Sim(K_3,K_2)+Sim(K_3,K_4)+\ldots+Sim(K_3,K_m))$. Similarly, the user specific similarity scores are calculated for other unused apps to rank them for identifying the top-N app recommendations for the user $U_i$.

[R3], also referred to as emerging app recommendation, uses a list of apps identified as fastest growing in terms of usage in a limited time window. For a time window of T days, if the current usage of an app is R(t) and R(t-T) is the usage before T days, then the current growth rate of the app is calculated as 100*R(t)/R(t-T). Accordingly, the apps are ranked based on the growth rate for identifying the top-N app recommendations.

[R4], also referred to as expert suggested app recommendation, uses a list of apps chosen by experts as high quality and popular apps for recommending to users.

In combining recommendations from [R1], [R2], [R3] and [R4], additional information may also be used. For example, usage profile for users containing various high-level past and real-time usage summary for users (e.g., most frequently used apps in last 7-days, last apps used, last tips served, last tips used, last tips usage time etc.) may be used to qualify tips. In addition, historic tips usage history may be used to adjust the ranking of app-app and user-app top-N suggested tips. For example, the more frequently adopted tips will get higher preferences for being recommended to the users again.

Based on the description above, each of these keyword recommendation algorithms [R1], [R2], [R3] and [R4] may provide top N number of recommended apps (the number N may be set differently for each module). The hybrid business rule module maintains a pointer for each module to track the previously recommended app, which identifies the next one from the available N recommendations to be served next time when a particular module is used again. In other words, the pointer advances in a sequential manner, which means if the $i^{th}$ recommendation was served last time when a particular module was used, then the $(i+1)^{th}$ recommendation will be served next time when the particular module is used again. For [R2], [R3] and [R4] this pointer is maintained at a user level to identify which recommendation to be served for a user. For [R1] this pointer is maintained at a user and app level to identify which recommendation to be served for a user while the user is requesting for a specific app. In addition, if a user has adopted a tip (i.e., used the app recommended in the tip) in last M days (e.g., last 30 days), then the corresponding app will be skipped and not be repeatedly recommended to the user.

The following describes the detailed steps to cater recommendations to a user while accessing the GTP in each of the four scenarios F7.1-F7.4 shown in FIG. 4A.

F7.1—When the user doesn't have adequate (i.e., statistically sufficient) past GTP usage information but the app being requested does have sufficient usage information by many other GTP users, then the tips is served from app-app recommendation [R1], emerging app recommendation [R3], and expert suggested app recommendation [R4] modules in a cyclic alternative fashion. In other words, the keyword recommendation algorithm selection sequence A (400a) specifies that the first time the tip is served from [R1] module (i.e., the recommended keyword is generated using the R1 algorithm) for n1 times before moving to emerging app module [R3]. Then the tip is served n3 times from [R3] module and subsequently from [R4] module for n4 times and then cycle back to [R1] module and so on so forth.

F7.2—When neither the user nor the app being requested has adequate past usage information, the keyword recommendation algorithm selection sequence B (400b) is used to specify that the tips are served from emerging app recommendation [R3] module for n3 times and expert suggested app recommendation [R4] module for n4 times in a cyclic alternative fashion as described above.

F7.3—When the app being requested doesn't have adequate past usage information but the user has enough usage history, the keyword recommendation algorithm selection sequence C (400c) is used to specify that the tips are served from app-app recommendation [R2] module for n2 times, emerging app recommendation [R3] module for n3 times and expert suggested app recommendation [R4] module for n4 times in a cyclic alternative fashion as described above.

F7.4—When both the app being requested and the user have sufficient usage history, the keyword recommendation algorithm selection sequence D (400d) is used to specify that the tips are served from app-app recommendation [R1] module for n1 times, user-app recommendation [R2] module for n2 times, emerging app recommendation [R3] module for n3 times, and expert suggested app recommendation [R4] module for n4 times in a cyclic alternative fashion as described above.

In the description of these scenarios above, whether a user has adequate usage information or nor is determined based on a pre-defined threshold of minimum request count for the user. In other words, the user has to access the GTP for a minimum number of times before it is determined that the user has statistically sufficient past GTP usage information. Similarly, whether an app has adequate usage information or not is determined based on a pre-defined threshold of minimum request count for the app. In other words, the app has to be requested/accessed for a minimum number of times before it is determined that the app has statistically sufficient past usage information.

Considering the following scenario where the user "A" has requested for "funchat" app, and both user "A" and app "funchat" have adequate usage history. The top recommended keywords are determined using [R1]-[R4] modules as follows.

[R1]: Top 5 (i.e., N=5) app-app recommendations for "funchat" include "chatbox," "chatme," "tribe," "message," and "journey."

[R2]: Top 5 user-app recommendations for user "A" include "train," "pnrinfo," "fbc," "message," and "smsstore."

[R3]: Top 5 emerging apps recommendations include "fbsms," "politics," "footyscore," "diary," and "crossword."

[R4]: Top 5 expert suggested apps recommendation include "cri," "akila," "smsbox," "funchat," and "news."

As an example with n1=2, n2=2, n3=1, and n4=1 in the scenario F7.4 described above, the module [R1] will be used twice before using [R2] twice. Then the modules [R3] and [R4] will each be used once before going back to module [R1] in a cyclic fashion. Now if a user "A" keeps on using "funchat" then the following sequence of apps will be recommend:

Cycle 1: "chatbox," "chatme," "train," "pnrinfo," "fbsms," "cri"

Cycle 2: "tribe," "message," "fbc," "message," "fbsms," "akila"

. . . and so on.

FIGS. 4B-4E shows example cell phone screenshots of the user "A" illustrating keyword recommendation based on the aforementioned cycle 1.

Figure 4C:
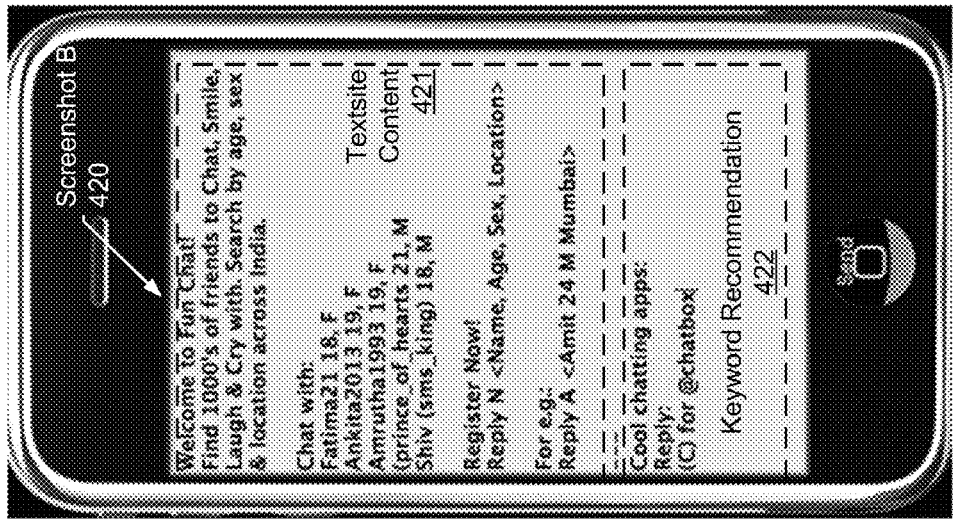
Figure 4B:
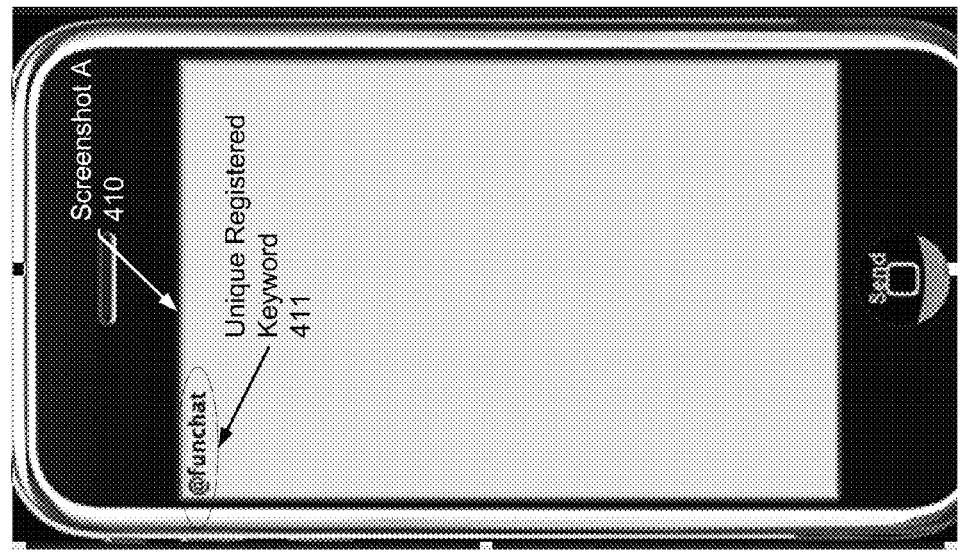

FIG. 4B shows a screenshot A (410) of a cell phone of the user "A." In particular, the screenshot A (410) is captured when the user "A" has typed up a TMS message ready for sending to the GTP (i.e., the user message). Specifically, the user message includes the unique registered keyword (411) "funchat" to request corresponding textsite content. Note that the keyword "funchat" is preceded with the special character "@" based on the GTP syntax. In response to the user "A" sending this user message, the cell phone receives a response from the GTP as shown in FIG. 4C.

FIG. 4C shows a screenshot B (420) of the cell phone of the user "A." In particular, the screenshot B (420) shows the response TMS message returned by the GTP (i.e., the GTP message). Specifically, the GTP message includes the textsite content (421) retrieved using the unique registered keyword (411) "funchat" followed by the keyword recommendation (422) (i.e., the tip). In particular, the keyword recommendation (422) introduces the unique registered keyword "chatbox" to the user "A" as described in the cycle 1 above. As noted above, the textsite content (421) and the keyword recommendation (422) are examples of the textsite content (151a) and keyword recommendation (151b), respectively, depicted in FIG. 1A.

Figure 4E:
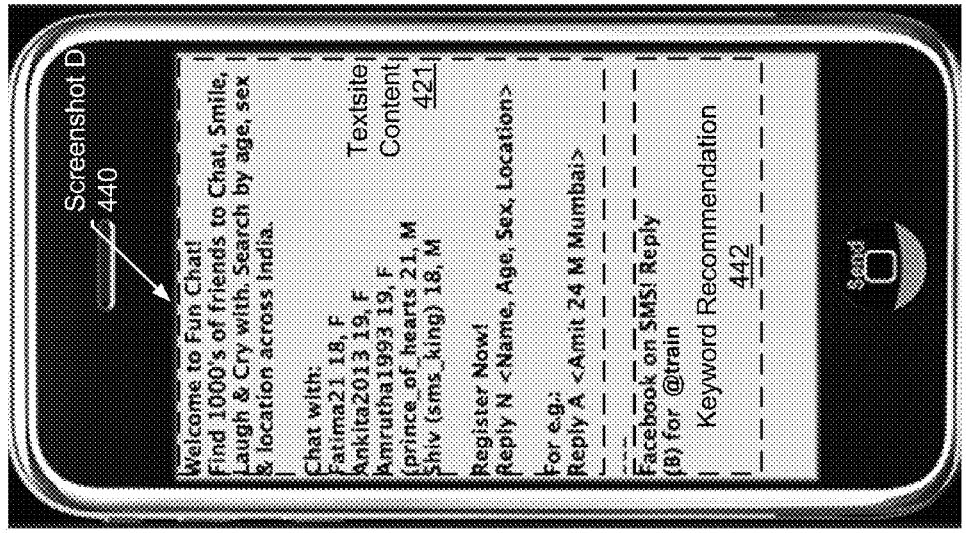
Figure 4D:

Based on user discretion, the user "A" may explore the GTP by submitting the unique registered keyword "chatbox" in the next user message sent to the GTP to check out the textsite identified by the unique registered keyword "chatbox." However, for illustration purpose, assuming the user resend the same user message shown in FIG. 4B above with the unique registered keyword (411) "funchat." In response to the user "A" sending this same unique registered keyword (411) "funchat," the cell phone receives a second response from the GTP as shown in FIG. 4D.

FIG. 4D shows a screenshot C (430) of the cell phone of the user "A." In particular, the screenshot C (430) shows the second response TMS message returned by the GTP (i.e., the second GTP message). Specifically, the second GTP message includes the same textsite content (421) retrieved using the same unique registered keyword (411) "funchat" as shown in FIG. 4C above. However, this time the textsite content (421) is followed by a different keyword recommendation (432) (i.e., a different tip). In particular, the keyword recommendation (432) introduces another unique registered keyword "chatme" to the user "A" as described in the cycle 1 above.

Based on user discretion, the user "A" may explore the GTP by submitting the unique registered keyword "chatme" in a third user message sent to the GTP to check out the textsite identified by the unique registered keyword "chatme." However, for illustration purpose, assuming the user resend, for the third time, the same user message shown in FIG. 4B above with the same unique registered keyword (411) "funchat." In response to the user "A" sending for the third time this same unique registered keyword (411) "funchat," the cell phone receives a third response from the GTP as shown in FIG. 4E.

FIG. 4E shows a screenshot D (440) of the cell phone of the user "A." In particular, the screenshot D (440) shows the third response TMS message returned by the GTP (i.e., the third GTP message). Specifically, the third GTP message includes the same textsite content (421) retrieved using the same unique registered keyword (411) "funchat" as shown in FIGS. 4C and 4D above. However, this time the textsite content (421) is followed by yet another different keyword recommendation (442) (i.e., another different tip). In particular, the keyword recommendation (442) introduces yet another unique registered keyword "train" to the user "A" as described in the cycle 1 above.

Although the description above generally refers to messages exchanged between the GTP and the user device as text messages transmitted via TMS, those skilled in the art with the benefit of this disclosure will appreciate that the invention is not intended to be limited to exchanges exclusively in text messages or using a TMS. For example, the GTP may provide functionalities to allow a user switching back and forth between browsing textsites via Internet using a computing device and navigating the textsites via telecommunication network using a mobile phone in a seamless fashion with uninterrupted handovers.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing a keyword recommendation for a user to access content from a global textsite platform (GTP), comprising:
    obtaining a first registered unique keyword, of a plurality of registered unique keywords, from a user message sent to the GTP by the user, wherein the plurality of registered unique keywords are used by a plurality of GTP users to access content from the GTP based on a text messaging service (TMS);
    selecting a keyword recommendation algorithm from a plurality of keyword recommendation algorithms based on a pre-determined selection sequence assigned to the plurality of keyword recommendation algorithms and a previously selected keyword recommendation algorithm;
    analyzing, by a computer processor using the keyword recommendation algorithm and based at least on the first registered unique keyword, a GTP usage pattern to select a recommended keyword from the plurality of registered unique keywords, wherein the GTP usage pattern comprises statistical information of the plurality of GTP users using the plurality of registered unique keywords to access content from the GTP; and
    sending the recommended keyword to the GTP,
    wherein the GTP sends, to the user in response to the user message, a GTP message comprising a keyword recommendation that identifies the recommended keyword, and
    wherein the user message and the GTP message comprise a TMS message.

2. The method of claim 1,
    wherein the GTP message further comprises textsite content retrieved from the GTP using the first registered unique keyword, and
    wherein the keyword recommendation comprises:
        a representation of the recommended keyword; and
        a description of content accessible using the recommended keyword from the GTP.

3. The method of claim 1, wherein analyzing the GTP usage pattern comprises:
    determining, based on the GTP usage pattern, a similarity measure between the first registered unique keyword and a second registered unique keyword of the plurality of registered unique keywords, wherein the similarity measure represents similarity between usage levels of the first registered unique keyword and the second registered unique keyword used by the plurality of GTP users; and
    selecting, in response to the similarity measure meeting a pre-determined criterion, the second registered unique keyword as the recommended keyword.

4. The method of claim 1, further comprises:
    generating a user specific usage pattern of the user using the plurality of registered unique keywords to access content from the GTP, wherein the GTP usage pattern further comprises the user specific usage pattern,
    wherein analyzing the GTP usage pattern comprises:
        determining, based on the user specific usage pattern, a user specific similarity measure between at least the first registered unique keyword and a second registered unique keyword of the plurality of registered unique keywords, wherein the user specific similarity measure represents similarity between usage levels of at least the first registered unique keyword and the second registered unique keyword used by the user; and
        selecting, in response to the user specific similarity measure meeting a pre-determined criterion, the second registered unique keyword as the recommended keyword.

5. The method of claim 1, further comprises:
    generating an emerging usage pattern of the plurality of GTP users using the plurality of registered unique keywords to access content from the GTP, wherein the GTP usage pattern further comprises the emerging usage pattern;
    wherein analyzing the GTP usage pattern comprises:
        determining, based on the emerging usage pattern, a rate of usage increase for a registered unique keyword of the plurality of registered unique keywords, wherein the rate of usage increase represents increase in usage levels of the plurality of GTP users using the registered unique keyword over a pre-determined recent time period; and selecting, in response to the rate of usage increase meeting a pre-determined criterion, the registered unique keyword as the recommended keyword.

6. The method of claim 1, further comprises:
obtaining a pre-determined ranking of a registered unique keyword among the plurality of registered unique keywords; and
wherein analyzing the GTP usage pattern comprises:
selecting, in response to the pre-determined ranking meeting a pre-determined criterion, the registered unique keyword as the recommended keyword.

7. The method of claim 1, further comprises:
obtaining at least one recommendation adoption pattern selected from a group consisting of a first recommendation adoption pattern of the plurality of GTP users adopting a plurality of previously provided keyword recommendations and a second recommendation adoption pattern of the user adopting the plurality of previously provided keyword recommendations; and
adjusting the plurality of keyword recommendation algorithms based on the at least one recommendation adoption pattern.

8. The method of claim 1, further comprises:
obtaining at least one usage level selected from a group consisting of a first usage level of the user using the plurality of registered unique keywords and the second usage level of the plurality of GTP users using the first registered unique keyword; and
identifying, based on the at least one usage level, the pre-determined selection sequence from a plurality of pre-determined selection sequences for assigning to the plurality of keyword recommendation algorithms.

9. A system for providing a keyword recommendation for a user to access content from a global textsite platform (GTP), comprising:
a computer processor;
memory storing instructions executable by the computer processor, wherein the instructions comprise:
a GTP interface module configured to:
obtain a first registered unique keyword, of a plurality of registered unique keywords, from a user message sent to the GTP by the user, wherein the plurality of registered unique keywords are used by a plurality of GTP users to access content from the GTP based on a text messaging service (TMS); and
sending a recommended keyword to the GTP;
a hybrid business rule module configured to select a keyword recommendation algorithm from a plurality of keyword recommendation algorithms based on a pre-determined selection sequence assigned to the plurality of keyword recommendation algorithms and a previously selected keyword recommendation algorithm; and
an analysis module configured to analyze, using the keyword recommendation algorithm and based at least on the first registered unique keyword, a GTP usage pattern to select the recommended keyword from the plurality of registered unique keywords, wherein the GTP usage pattern comprises statistical information of the plurality of GTP users using the plurality of registered unique keywords to access content from the GTP; and
a repository for storing the GTP usage pattern and the pre-determined selection sequence assigned to the plurality of keyword recommendation algorithms,
wherein the GTP sends, to the user in response to the user message, a GTP message comprising a keyword recommendation that identifies the recommended keyword, and
wherein the user message and the GTP message comprise a TMS message.

10. The system of claim 9,
wherein the GTP message further comprises textsite content retrieved from the GTP using the first registered unique keyword, and
wherein the keyword recommendation comprises:
a representation of the recommended keyword; and
a description of content accessible using the recommended keyword from the GTP.

11. The system of claim 9, wherein analyzing the GTP usage pattern comprises:
determining, based on the GTP usage pattern, a similarity measure between the first registered unique keyword and a second registered unique keyword of the plurality of registered unique keywords, wherein the similarity measure represents similarity between usage levels of the first registered unique keyword and the second registered unique keyword used by the plurality of GTP users using; and
selecting, in response to the similarity measure meeting a pre-determined criterion, the second registered unique keyword as the recommended keyword.

12. The system of claim 9, wherein the analysis module is further configured to:
generate a user specific usage pattern of the user using the plurality of registered unique keywords to access content from the GTP, wherein the GTP usage pattern further comprises the user specific usage pattern,
wherein analyzing the GTP usage pattern comprises:
determining, based on the user specific usage pattern, a user specific similarity measure between at least the first registered unique keyword and a second registered unique keyword of the plurality of registered unique keywords, wherein the user specific similarity measure represents similarity between usage levels of at least the first registered unique keyword and the second registered unique keyword used by the user; and
selecting, in response to the user specific similarity measure meeting a pre-determined criterion, the second registered unique keyword as the recommended keyword.

13. The system of claim 9, wherein the analysis module is further configured to:
generate an emerging usage pattern of the plurality of GTP users using the plurality of registered unique keywords to access content from the GTP, wherein the GTP usage pattern further comprises the emerging usage pattern;
wherein analyzing the GTP usage pattern comprises:
determining, based on the emerging usage pattern, a rate of usage increase for a registered unique keyword of the plurality of registered unique keywords, wherein the rate of usage increase represents increase in usage levels of the plurality of GTP users using the registered unique keyword over a pre-determined recent time period; and
selecting, in response to the rate of usage increase meeting a pre-determined criterion, the registered unique keyword as the recommended keyword.

14. The system of claim 9, wherein the analysis module is further configured to:
   obtain a pre-determined ranking of a registered unique keyword among the plurality of registered unique keywords; and
   wherein analyzing the GTP usage pattern comprises:
      selecting, in response to the pre-determined ranking meeting a pre-determined criterion, the registered unique keyword as the recommended keyword.

15. The system of claim 9, wherein the hybrid business rule module is further configured to:
   obtain at least one recommendation adoption pattern selected from a group consisting of a first recommendation adoption pattern of the plurality of GTP users adopting a plurality of previously provided keyword recommendations and a second recommendation adoption pattern of the user adopting the plurality of previously provided keyword recommendations; and
   identify, based on the at least one usage level, the pre-determined selection sequence from a plurality of pre-determined selection sequences for assigning to the plurality of keyword recommendation algorithms.

16. The system of claim 9, wherein the hybrid business rule module is further configured to:
   obtain at least one usage level selected from a group consisting of a first usage level of the user using the plurality of registered unique keywords and the second usage level of the plurality of GTP users using the first registered unique keyword; and
   adjust the pre-determined selection sequence assigned to the plurality of keyword recommendation algorithms based on the at least one usage level.

17. A non-transitory computer readable storage medium comprising software instructions for providing a keyword recommendation for a user to access content from a global textsite platform (GTP), that when executed, comprise functionality for:
   obtaining a first registered unique keyword, of a plurality of registered unique keywords, from a user message sent to the GTP by the user, wherein the plurality of registered unique keywords are used by a plurality of GTP users to access content from the GTP based on a text messaging service (TMS);
   selecting a keyword recommendation algorithm from a plurality of keyword recommendation algorithms based on a pre-determined selection sequence assigned to the plurality of keyword recommendation algorithms and a previously selected keyword recommendation algorithm;
   analyzing, using the keyword recommendation algorithm and based at least on the first registered unique keyword, a GTP usage pattern to select a recommended keyword from the plurality of registered unique keywords, wherein the GTP usage pattern comprises statistical information of the plurality of GTP users using the plurality of registered unique keywords to access content from the GTP; and
   sending the recommended keyword to the GTP,
   wherein the GTP sends, to the user in response to the user message, a GTP message comprising a keyword recommendation that identifies the recommended keyword, and
   wherein the user message and the GTP message comprise a TMS message.

18. The non-transitory computer readable storage medium of claim 17,
   wherein the GTP message further comprises textsite content retrieved from the GTP using the first registered unique keyword, and
   wherein the keyword recommendation comprises:
      a representation of the recommended keyword; and
      a description of content accessible using the recommended keyword from the GTP.

19. The non-transitory computer readable storage medium of claim 17, wherein analyzing the GTP usage pattern comprises:
   determining, based on the GTP usage pattern, a similarity measure between the first registered unique keyword and a second registered unique keyword of the plurality of registered unique keywords, wherein the similarity measure represents similarity between usage levels of the first registered unique keyword and the second registered unique keyword used by the plurality of GTP users; and
   selecting, in response to the similarity measure meeting a pre-determined criterion, the second registered unique keyword as the recommended keyword.

20. The non-transitory computer readable storage medium of claim 17, the instructions, when executed, comprise functionality for:
   generating a user specific usage pattern of the user using the plurality of registered unique keywords to access content from the GTP, wherein the GTP usage pattern further comprises the user specific usage pattern,
   wherein analyzing the GTP usage pattern comprises:
      determining, based on the user specific usage pattern, a user specific similarity measure between at least the first registered unique keyword and a second registered unique keyword of the plurality of registered unique keywords, wherein the user specific similarity measure represents similarity between usage levels of at least the first registered unique keyword and the second registered unique keyword used by the user; and
      selecting, in response to the user specific similarity measure meeting a pre-determined criterion, the second registered unique keyword as the recommended keyword.

21. The non-transitory computer readable storage medium of claim 17, the instructions, when executed, comprise functionality for:
   generating an emerging usage pattern of the plurality of GTP users using the plurality of registered unique keywords to access content from the GTP, wherein the GTP usage pattern further comprises the emerging usage pattern;
   wherein analyzing the GTP usage pattern comprises:
      determining, based on the emerging usage pattern, a rate of usage increase for a registered unique keyword of the plurality of registered unique keywords, wherein the rate of usage increase represents increase in usage levels of the plurality of GTP users using the registered unique keyword over a pre-determined recent time period; and
      selecting, in response to the rate of usage increase meeting a pre-determined criterion, the registered unique keyword as the recommended keyword.

22. The non-transitory computer readable storage medium of claim 17, the instructions, when executed, comprise functionality for:

obtaining a pre-determined ranking of a registered unique keyword among the plurality of registered unique keywords; and wherein analyzing the GTP usage pattern comprises:

selecting, in response to the pre-determined ranking meeting a pre-determined criterion, the registered unique keyword as the recommended keyword.

23. The non-transitory computer readable storage medium of claim 17, the instructions, when executed, comprise functionality for:

obtaining at least one recommendation adoption pattern selected from a group consisting of a first recommendation adoption pattern of the plurality of GTP users adopting a plurality of previously provided keyword recommendations and a second recommendation adoption pattern of the user adopting the plurality of previously provided keyword recommendations; and adjusting the plurality of keyword recommendation algorithms based on the at least one recommendation adoption pattern.

24. The non-transitory computer readable storage medium of claim 17, the instructions, when executed, comprise functionality for:

obtaining at least one usage level selected from a group consisting of a first usage level of the user using the plurality of registered unique keywords and the second usage level of the plurality of GTP users using the first registered unique keyword; and identifying, based on the at least one usage level, the pre-determined selection sequence from a plurality of pre-determined selection sequences for assigning to the plurality of keyword recommendation algorithms.

* * * * *